(12) United States Patent
Cairns et al.

(10) Patent No.: US 8,045,600 B2
(45) Date of Patent: Oct. 25, 2011

(54) METHOD AND APPARATUS FOR COMPENSATING FOR PROCESSING TIMING MISALIGNMENT IN A COMMUNICATION RECEIVER

(75) Inventors: Douglas A. Cairns, Durham, NC (US); Stephen J. Grant, Cary, NC (US); Andres Reial, Malmö (SE); Mathias Riback, Danderyd (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 848 days.

(21) Appl. No.: 12/111,526

(22) Filed: Apr. 29, 2008

(65) Prior Publication Data

US 2009/0268787 A1 Oct. 29, 2009

(51) Int. Cl.
H04B 1/00 (2006.01)
(52) U.S. Cl. .......................... 375/148; 375/354; 375/316
(58) Field of Classification Search .................. 375/148, 375/354, 316
See application file for complete search history.

(56) References Cited

U.S. PATENT DOCUMENTS

| 6,674,815 B2* | 1/2004 | Zangi | 375/340 |
|---|---|---|---|
| 6,839,378 B1 | 1/2005 | Sourour et al. | |
| 6,922,434 B2 | 7/2005 | Wang et al. | |
| 7,751,511 B2* | 7/2010 | Reial et al. | 375/346 |
| 7,822,101 B2* | 10/2010 | Reial | 375/144 |
| 2004/0253934 A1* | 12/2004 | Ryu et al. | 455/101 |
| 2005/0047485 A1 | 3/2005 | Khayrallah et al. | |
| 2005/0195889 A1* | 9/2005 | Grant et al. | 375/148 |
| 2005/0201447 A1* | 9/2005 | Cairns et al. | 375/148 |
| 2006/0007990 A1* | 1/2006 | Cozzo et al. | 375/148 |
| 2006/0029124 A1* | 2/2006 | Grant et al. | 375/148 |
| 2006/0188007 A1* | 8/2006 | Daneshrad et al. | 375/148 |
| 2006/0268962 A1 | 11/2006 | Cairns et al. | |
| 2007/0047628 A1* | 3/2007 | Fulghum et al. | 375/148 |
| 2007/0098048 A1* | 5/2007 | Cairns et al. | 375/142 |
| 2007/0116100 A1* | 5/2007 | Lindoff et al. | 375/148 |
| 2007/0189364 A1* | 8/2007 | Wang et al. | 375/148 |
| 2008/0002759 A1* | 1/2008 | Cairns et al. | 375/148 |
| 2008/0267164 A1* | 10/2008 | D'Alessandro | 370/350 |
| 2009/0213944 A1* | 8/2009 | Grant | 375/260 |

FOREIGN PATENT DOCUMENTS

| WO | 2006/070320 A1 | 7/2006 |
|---|---|---|
| WO | 2008/000367 A1 | 1/2008 |

OTHER PUBLICATIONS

Bottomley, "A generalized RAKE receiver for interference suppression," IEEE Journal on Selected Areas of Communication, vol. 18, pp. 1536-1545, Aug. 2000.*

(Continued)

*Primary Examiner* — Juan A Torres
(74) *Attorney, Agent, or Firm* — Coats & Bennett, P.L.L.C.

(57) ABSTRACT

According to the teachings presented herein, a wireless communication apparatus compensates for timing misalignment in its received signal processing. In at least one embodiment, the apparatus estimates a set of path delays for a received signal and sets processing delays on the estimated path delays. The apparatus jointly hypothesizes combinations of fractional timing offsets for two or more paths, and computes a decision metric for each joint hypothesis that indicates the accuracy of the joint hypothesis. As non-limiting examples, the decision metric may be a signal quality metric, or a distance metric (such as between a measured net channel response and an effective net channel response reconstructed as a function of the combination of fractional timing offsets included in the joint hypothesis). The apparatus evaluates the decision metrics to identify a best estimate of timing misalignment, and correspondingly compensates coherent processing of the received signal.

30 Claims, 8 Drawing Sheets

OTHER PUBLICATIONS

Bottomley, "Optimizing the Performance of Limited Complexity RAKE Receivers," Proc. 48th IEEE Vehicle Technology Conf., Ottawa, Canada, May 1998.*

Fulghum, "Low Complexity Parameter Estimation for the Multi-antenna Generalized Rake Receiver," IEEE 63rd Vehicular Technology Conference, 2006, VTC 2006-Spring, vol. 4, No., pp. 1874-1878, May 7-10, 2006.*

* cited by examiner

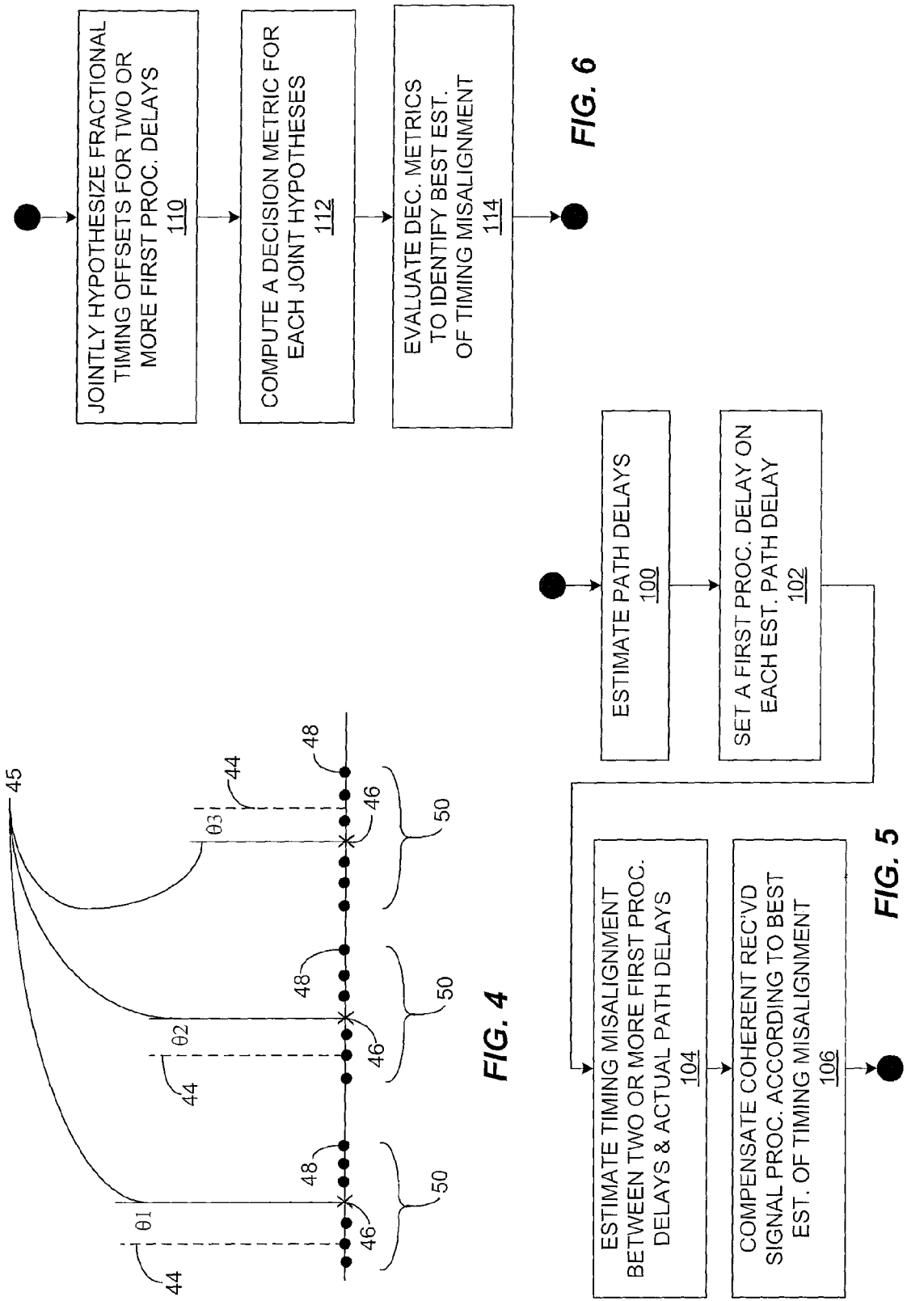

METHOD AND APPARATUS FOR COMPENSATING FOR PROCESSING TIMING MISALIGNMENT IN A COMMUNICATION RECEIVER

TECHNICAL FIELD

The present invention generally relates to communication signal processing, and particularly relates to compensating for processing timing misalignment in a communication receiver.

BACKGROUND

Interference and noise are the main signal impairments affecting receiver performance in code division multiple access (CDMA) systems. Linear equalization receivers compensate for interference arising from dispersive channels (inter-symbol and/or inter-code), and compensate for noise coloration caused by the receive filter. Generalized Rake receivers perform symbol-level processing, while chip equalizer (CE) receivers perform chip-level processing, but they are equivalent examples of linear equalization receivers. A good introduction to G-Rake processing appears in G. E. Bottomley, T. Ottosson, and Y.-P. E. Wang, "A generalized RAKE receiver for interference suppression," IEEE J. Select. Areas Commun., vol. 18, pp. 1536-1545, Aug. 2000.

As a generalization, linear equalization receivers set processing delays on estimated path delays, to collect desired signal energy, and set additional processing delays off-path, at positions good for characterizing interfering signal energy. Interference due to dispersion and noise are the main sources of performance degradation for the scenarios considered prior to release 7 of the Wideband-CDMA (WCDMA) standard (Release 7).

Release 7 introduces multiple-input multiple-output (MIMO) schemes, along with higher order modulation. Performance requirements for higher signal to noise ratios (SNR) than previously considered were also introduced. The increased complexities and more stringent signal quality requirements translate into requirements for more precise modulation and demodulation processes than were required for previous standard releases. Similar performance and precision improvements are being driven in other wireless standards, too, as increasingly complex modulation/demodulation schemes are adopted to achieve higher data rates.

The increased precision requirements for signal processing leads to a new source of interference that may be referred to as "timing offset." For example, when multiple transmit (TX) antennas are used at a base station, each transmission chain has some inherent delay due to the physical components involved (cabling, filtering, etc.). If the base station transceiver does not compensate for the difference in delay between TX chains, the transmitted signals will be received with some time misalignment. Misalignment can be a significant issue if the transmissions are to be combined coherently at the receiver. Similarly, when multiple receive (RX) antennas are used, differences in the RX chains, such as filter group delay differences, can cause an effective time misalignment in the respective received signals. Again, this misalignment becomes a potentially significant performance issue in coherent combining.

Even in the absence of misalignment in parallel transmit/receive chains, timing offset issues arise from the coarseness of the timing grids used by many receivers for reporting the path delays of a multiple-component received signal. For example, a delay reporting grid on the order of one-half to one-quarter of a chip may be used to identify path delays in a typical WCDMA receiver. However, research has shown that delays must be tracked to within as little as one sixty-fourth of a chip to avoid performance degradation.

Various techniques are known for improved delay estimation. For example, sophisticated multipath delay estimation is taught in the commonly owned U.S. Pat. No. 6,839,378 B1 to Sourour, et al. In the '378 patent, one embodiment of delay estimation processes paths in ray strength order, so that delay estimation is improved by subtracting out the influence of stronger paths for estimating the delays of the weaker paths. Further, the commonly owned U.S. Pat. No. 6,674,815 B2 to Zangi teaches exemplary techniques for tracking fractionally-spaced fading radio channels, for symbol-spaced estimation processing.

Still further, various techniques are known for improving Rake finger placement in view of the potential coarseness of the delay reporting grid. For example, different placement grids for path searching and Rake finger placement are used in the commonly-owned and co-pending U.S. patent application identified by application Ser. No. 10/653,679, which is published as US 2005/0047485 A1. In the '679 application, an independent timing grid of potentially finer resolution is used to place Rake fingers on and around signal path delays reported using a potentially coarser timing grid. The use of independent search and placement grids allows for some "tuning" of finger placement.

However, to the extent that path delays are identified and corresponding processing delays are placed according to timing grids limited to practical timing resolutions, one may expect timing offset issues potentially to be present in any practical receiver. Correspondingly, one technique for managing the potential performance problems arising from timing offset appears in the commonly-owned and co-pending U.S. patent application identified by application Ser. No. 11/219,183 and published as US 2006/0268962 A1. In the '183 application, a Rake receiver switches between one-finger and multi-finger modes, for example, based on determining which mode offers a better signal quality measure. The '183 application teaches that single-finger despreading yields better performance in the absence of appreciable timing offset between an estimated and an actual channel delay, while multi-finger despreading is better in the presence of appreciable timing offset.

SUMMARY

According to the teachings presented herein, a wireless communication apparatus and method compensate for timing misalignment in received signal processing. For example, in at least one embodiment, the apparatus estimates a set of path delays for a received signal and sets processing delays on the estimated path delays. The apparatus jointly hypothesizes combinations of fractional timing offsets for two or more paths, and computes a decision metric for each joint hypothesis that indicates the accuracy of the joint hypothesis. As non-limiting examples, the decision metric may be a signal quality metric, or a distance metric (such as between a measured net channel response and an effective net channel response reconstructed as a function of the combination of fractional timing offsets included in the joint hypothesis). The apparatus evaluates the decision metrics to identify a best estimate of timing misalignment, and correspondingly compensates coherent processing of the received signal.

In one or more embodiments, the apparatus comprises or otherwise includes a Generalized Rake (G-Rake) receiver, or a chip equalizer (CE) receiver. In such embodiments, first processing delays (finger delays or filter taps) are set on estimated processing delays, and timing misalignments for two or more paths are jointly hypothesized and evaluated in terms of their corresponding decision metrics. The best estimate of timing misalignment, which comprises the combination of fractional timing offsets for the two or more paths for which offsets were hypothesized, is identified from the "best" decision metric. The concept of "best" depends on the type of decision metric, and may be, e.g., the highest SNR or the smallest distance/error measure. Further, additional teachings presented herein provide advantageous placement of processing delays for coherent received signal processing.

Accordingly, in one or more embodiments, a wireless communication apparatus is configured to compensate for received signal processing timing misalignment, and includes one or more processing circuits configured to estimate a set of path delays for a received signal according to a first timing resolution, set a first processing delay on each estimated path delay according to a second timing resolution, and estimate timing misalignment between two or more of the first processing delays and actual path delays. Timing misalignment estimation includes jointly hypothesizing combinations of fractional timing offsets between the two or more first processing delays and actual path delays, computing a decision metric for each joint hypothesis that indicates the accuracy of the joint hypothesis, and evaluating the decision metrics to identify a best estimate of timing misalignment for the two or more estimated path delays. The apparatus compensates coherent processing of the received signal according to the best estimate of timing misalignment. Compensation comprises, for example, incorporating the fractional timing offsets included in the best estimate of timing misalignment into the computation of received signal impairment correlations, and correspondingly determining combining weights from the (compensated) impairment correlations, for coherent combining of the received signal.

Further, in at least one such embodiment, the one or more processing circuits are configured to estimate timing misalignment for each of two or more transmit/receive antenna pairings, which is advantageous, for example, in Multiple-Input-Multiple-Output (MIMO) or other multi-antenna scenarios. Further, in one or more embodiments, the one or more processing circuits are configured to compute the decision metrics as smoothed decision metrics based on computing an instantaneous decision metric for each joint hypothesis in each of two or more time intervals, and maintaining a smoothed decision metric for each joint hypothesis by averaging corresponding ones of the instantaneous decision metrics over the two or more time intervals.

Still further, in one or more embodiments, the one or more processing circuits are configured to compute a decision metric for each joint hypothesis that indicates the accuracy of the joint hypothesis by one of computing a signal quality metric as a function of the joint hypothesis, or computing a channel distance metric as a function of the joint hypothesis. For example, the processing circuit(s) are configured in one embodiment to compute the decision metrics as signal quality metrics, assuming compensation of coherent signal combining according to the combination of fractional timing offsets included in the joint hypotheses. In other embodiments, the processing circuit(s) are configured to compute the decision metrics in a manner that offers computational efficiency, wherein the decision metric for each joint hypothesis is computed as a distance metric indicating how well a jointly reconstructed effective net channel response, which is computed as a function of the fractional timing offsets included in the joint hypothesis, matches a measured net channel response.

Correspondingly, according to one or more embodiments taught herein, a method of compensating for processing timing misalignment in a communication receiver includes estimating a set of path delays for a received signal according to a first timing resolution, and setting a first processing delay on each estimated path delay according to a second timing resolution. The method further includes estimating timing misalignment between two or more of the first processing delays and actual path delays. This estimation is, in one or more embodiments, based on jointly hypothesizing combinations of fractional timing offsets between the two or more first processing delays and actual path delays, computing a decision metric for each joint hypothesis that indicates the accuracy of the joint hypothesis, and evaluating the decision metrics to identify a best estimate of timing misalignment for the two or more estimated path delays. The method further includes compensating coherent processing of the received signal according to the best estimate of timing misalignment.

However, the present invention is not limited to the above summary of features and advantages. Indeed, those skilled in the art will recognize additional features and advantages upon reading the following detailed description, and upon viewing the accompanying drawings.

BRIEF DESCRIPTION OF THE DRAWINGS

FIGS. 3 and 4 are diagrams of sets of fractional timing hypotheses, such as may be formed by establishing a grid of fractionally-spaced timing offsets around estimated path delays.

FIG. 5 is a logic flow diagram illustrating an embodiment of processing logic for implementing a method of estimating fractional timing offsets.

FIG. 6 is a logic flow diagram illustrating an embodiment of processing details for the estimation of timing misalignment as shown in FIG. 5.

DETAILED DESCRIPTION

Figure 1:
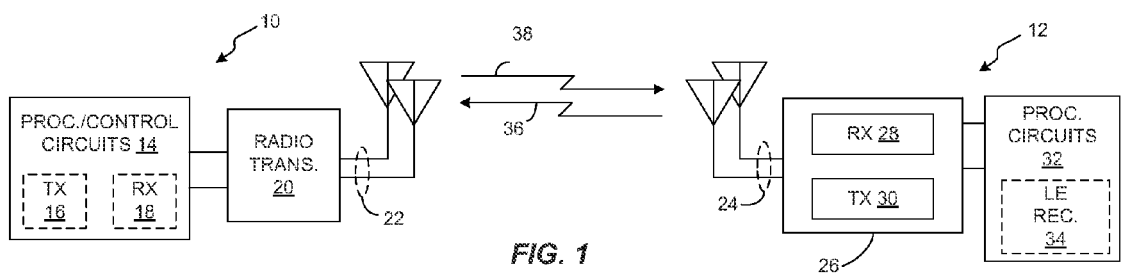
FIG. 1 is block diagram of an embodiment of a base station and an embodiment of a wireless communication apparatus, such as a mobile station.

FIG. 1 illustrates a base station 10 and a wireless communication apparatus 12, supported by the base station 10. In at least one embodiment, the base station 10 comprises a Wideband Code Division Multiple Access (WCDMA) base station (e.g., a "nodeB") configured for operation in a WCDMA-based communication network. Correspondingly, the wireless communication apparatus 12 comprises a WCDMA-based mobile station, such as a cellular radiotelephone, pager, portable wireless computer, or other wireless communication device.

According to the non-limiting details in the illustration, the base station 10 comprises processing/control circuits 14, including transmit and receive signal processors 16 and 18, respectively, radio transceivers 20, and one or more associated transmit/receive (TX/RX) antennas 22. In at least one embodiment, the base station 10 operates as a Multiple-Input-Multiple-Output (MIMO) transmitter. As further detailed, the illustrated embodiment of the wireless communication apparatus 12 comprises one or more TX/RX antennas 24, radiofrequency (RF) transmit and receive circuits 26 that include an RX front-end circuit 28 and a RF transmit circuit 30. The wireless communication apparatus 12 further comprises one or more processing circuits 32, which include or otherwise functionally embody a linear equalization receiver 34. According to the teachings presented herein, the one or more processing circuits 32 are configured to compensate coherent processing of received signals based on estimating processing timing misalignment.

As those skilled in the art will appreciate, such compensation processing may be implemented in hardware, software, or any combination thereof. In at least one embodiment, the one or more processing circuits 32 comprise one or more digital processing circuits—e.g., microprocessor(s), DSP(s), ASIC(s) with or without micro/DSP cores, etc.—that are configured to carry out timing misalignment determination and corresponding compensation through a defined hardware configuration. In other embodiments, they carry out the disclosed timing misalignment determination and compensation based on executing computer program instructions stored in an included computer-readable medium, such as a non-volatile integrated memory circuit included in the wireless communication apparatus 12.

In operation, the wireless communication apparatus 12 transmits uplink signals 36 and receives downlink signals 38. As noted, the base station 10 may operate as a MIMO transmitter, where the wireless communication apparatus 12 is correspondingly configured to operate as MIMO receiver. In such configurations, the downlink signals 38 may comprise multiple streams, and the antenna-received signals processed by the wireless communication apparatus 12 have multiple components received at multiple path delays. ("Path delay" can be considered to include propagation path delays for dispersive channels, and to include any timing delay differences in the involved TX/RX signal processing circuits.) Similarly, with transmit and/or receive diversity operation, and even with simple single-antenna operation in dispersive channels, the wireless communication apparatus 12 receives a communication signal—e.g., a direct sequence code division multiple access (DS-CDMA) signal—that, from the perspective of the processing circuit(s) 34, includes multiple delay components to be coherently processed/combined.

In carrying out coherent processing, the wireless communication apparatus 12 estimates path delays and sets processing delays on the estimated path delays. ("Setting" a processing delay comprises, for example, time-wise aligning a Rake finger with a reported path delay, or, equivalently, aligning a CE filter tap with the reported delay. However, as detailed herein, path delay reporting and processing delay placement are practically limited to relatively coarse timing resolutions. For example, path delay reporting and/or processing delay placement may be performed using one-half or one-quarter chip resolutions. As such, there frequently will be timing misalignment between one or more of the estimated path delays and corresponding ones of the actual path delays.

The processing circuit(s) 32, e.g., such as by appropriate configuration of the linear equalization receiver 34, are configured to estimate timing misalignment for one or more paths of interest. (Paths of interest are, for example, one or more of the most significant path delays. The "significance" of a path can be evaluated in terms of its signal strength relative to other identified paths.) More particularly, the wireless communication apparatus 12 identifies fractional timing offsets for one or more estimated path delays that are closer in time to the corresponding actual path delays, and compensates coherent processing of the received signal according to the identified fractional offsets. (The term "fractional timing offset" connotes offsets relative to an identified delay that are spaced at a timing resolution that is fractional, for example, with respect to the timing resolution used for path reporting and/or processing delay placement. The teachings presented herein allow arbitrarily small fractional timing offsets to be evaluated, such as 1/64 of a chip or less.)

Figure 2:
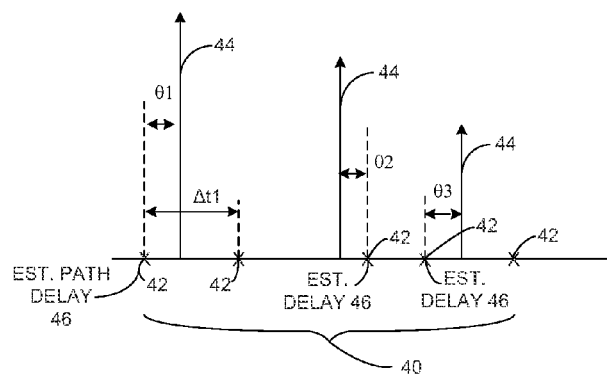
FIG. 2 is a diagram of estimated path delays and corresponding timing offsets relative to actual path delays, such as may be estimated using fractional timing offsets as taught herein.
Figure 3:
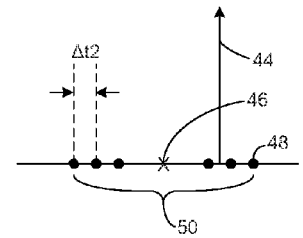

FIG. 2 illustrates a non-limiting example, wherein the wireless communication apparatus 12 uses a delay reporting grid 40 having delay timing positions 42 defined according to a first timing resolution, denoted as $\Delta t1$. The grid positions 42 that are closest to actual path delays 44 are reported as estimated path delays 46. One sees that actual timing offsets $\theta x$ (e.g., $\theta 1$, $\theta 2$, and $\theta 3$) exist between estimated path delays 46 and corresponding actual path delays 44. Such timing misalignments arise to the extent that the delay reporting grid 40 is too coarse to align with one or more of the actual path delays 44. However, as shown in the example illustration of FIG. 3, the wireless communication apparatus 12 advantageously hypothesizes one or more fractional timing offsets 48 for one or more of the estimated path delays 46. More particularly, in at least one such embodiment, the wireless communication apparatus 12 sets first processing delays on the estimated path delays 46, and determines timing misalignment between two or more of these first processing delays and the corresponding actual path delays.

For example, the wireless communication apparatus 12 in one or more embodiments estimates a set of path delays for a received signal according to a first timing resolution, and sets a first processing delay on each estimated path delay according to a second timing resolution. The first and second timing resolutions may be different, or may be the same, such as where the same timing grid resolution is used to report received signal path delays and to set processing delays for coherently processing the received signal. In either case, it will be understood that the finite resolution used to set the processing delays generally results in at least some timing misalignment between one or more of the first processing delays and the corresponding actual path delays.

As such, the wireless communication apparatus 12 estimates timing misalignment between two or more of the first processing delays and the corresponding actual path delays by jointly hypothesizing combinations of fractional timing offsets between the two or more first processing delays and actual path delays, computing a decision metric for each joint hypothesis that indicates the accuracy of the joint hypothesis, and evaluating the decision metrics to identify a best estimate of timing misalignment for the two or more estimated path delays. The wireless communication apparatus 12 compensates coherent processing of the received signal according to the best estimate of timing misalignment.

In at least one embodiment, the wireless communication receiver 12 carries out such processing by establishing a set 50 of fractional timing offsets 48 around two or more estimated path delays 46, which amounts to placing a grid of fractionally spaced timing offsets around two or more of the first processing delays, which are aligned with the estimated path delays within the limits of the timing resolution(s) used to estimate path delays 46 and place corresponding first processing delays. One sees that the spacing $\Delta t2$ used to establish the set 50 of fractional timing offsets 48 is fractional with respect to the timing resolution $\Delta t1$ used for delay path reporting. Further, as shown in FIG. 4, the wireless communication apparatus 12 may hypothesize a set 50 of fractional timing offsets 48 for each of two or more estimated path delays 46. For example, it may do so for two or more of the most significant estimated path delays 46.

Doing so allows the wireless communication apparatus 12 to jointly hypothesize combinations of fractional timing offsets for two or more of the first processing delays/path delays 46. More particularly, referring to FIG. 4, an example joint hypothesis includes a fractional timing offset 48 from each of the three sets 50, or at least from two of the sets 50. Thus, different joint hypotheses are formed as different combinations of fractional timing offsets 48 taken from two or more sets 50 of fractional timing offsets, as referenced to two or more first processing delays/estimated path delays 46. It should be understood however, that joint hypotheses may be formed for fewer than all estimated path delays 46. For example, timing misalignment estimation may be limited to the two strongest or otherwise most significant delay paths 46, and the joint hypotheses would correspondingly include combinations of fractional timing offsets for these two paths of interest.

However, before exploring such details, FIG. 5 outlines broader aspects taught herein for a method of compensating for processing timing misalignment in a communication receiver, e.g., in the wireless communication apparatus 12. As will be appreciated, the illustrated embodiment of the method may be implemented in hardware and/or software based processing logic within the one or more processing circuits 32 included in the wireless communication apparatus 12. Also, it should be understood that the illustrated processing may be performed on an ongoing basis, such as by being repeated over a succession of timing intervals, e.g., transmit time slots within a WCDMA Transmission Time Interval (TTI). Further, such processing may be performed in parallel with, or along with other ongoing processing and control operations.

With these and other points of implementation flexibility in mind, the illustrated processing "begins" with estimating path delays 46 for a received communication signal (Block 100). Such estimation is performed, for example, by a path searcher/delay reporter operating on a first timing resolution $\Delta t1$. Processing continues with setting a first processing delay on each estimated path delay according to a second timing resolution (Block 102). The first processing delays are used in coherently processing the received signal, e.g., sampling/combining at those delays. Processing continues with estimating timing misalignment between two or more of the first processing delays and actual path delays 44 (Block 104). This should be understood as determining timing misalignment between each one of two or more first processing delays and the corresponding actual path delay 44. Timing misalignment is estimated for fewer than all estimated path delays 46 in one or more embodiments, such as by limiting such estimation to the estimated path delays 46 that are most significant. In any case, processing continues with compensating coherent processing of the received signal (Block 106) based on the best estimate of timing misalignment.

Offering example details for the preceding method processing, FIG. 6 illustrates one embodiment of timing misalignment estimation operations for Block 102 of FIG. 5. Here, estimating timing misalignment for one or more estimated delay paths 46 comprises jointly hypothesizing combinations of fractional timing offsets between the two or more first processing delays and actual path delays (Block 110), computing a decision metric for each joint hypothesis that indicates the accuracy of the joint hypothesis (Block 112), and evaluating the decision metrics to identify a best estimate of timing misalignment for the two or more estimated path delays (Block 114).

In the above processing, jointly hypothesizing fractional timing offsets for two or more first processing delays comprises, in one or more embodiments, forming combinations of fractional timing offsets 48 by taking a particular fractional offset 48 from each of two or more sets 50 of fractional timing offsets 48, as placed around two or more of the estimated path delays 46. Again, one may refer to FIG. 4, for an illustration of how different members in each set 50 of fractional timing offsets 48 may be closer or further away from a corresponding actual path delay 44, depending upon how those actual path delays 44 fall relative to the corresponding estimated path delays 46.

In at least one embodiment, computing a decision metric for each joint hypothesis that indicates the accuracy of the joint hypothesis comprises one of computing a signal quality metric as a function of the joint hypothesis, or computing a channel distance metric as a function of the joint hypothesis. For example, a signal quality decision metric can be computed for each joint hypothesis, assuming compensation of coherent signal processing according to the combination of fractional timing offsets 48 included in the joint hypothesis. In another embodiment, the decision metric for each joint hypothesis is computed as a channel distance metric. Doing so may comprise jointly reconstructing an effective net channel response over the set 45 of estimated path delays 46 as adjusted for the combination of fractional timing offsets 48 in the joint hypothesis and comparing or otherwise evaluating the effective net channel response with respect to a measured net channel response.

In more detail, the effective net channel response for each joint hypothesis is jointly reconstructed as a function of the measured net channel response and a conversion matrix that converts medium channel responses to net channel responses. The elements of the conversion matrix comprise the convolution of the transmit/receive pulse filters calculated for differences among the set of estimated path delays 46, as adjusted according to the combination of fractional timing offsets 48 included in the joint hypothesis.

Depending on the type of decision metric calculated, the "best" estimate of timing misalignment includes those fractional timing offsets corresponding to the effective net channel response yielding the smallest or largest decision metric. Particularly, for a distance-based decision metric, the evaluation would choose the fractional timing offset(s) associated with the smallest one of the decision metrics as the best estimate of timing misalignment. Evaluating decision metrics that indicate received signal quality would involve selecting the decision metric indicating the highest or greatest signal quality.

Further, as taught herein timing misalignment processing as taught herein advantageously uses "smoothed" decision metrics in one or more embodiments, for improved processing performance and robustness. In at least one such embodiment, computing the decision metrics as smoothed decision metrics comprises computing an instantaneous decision metric for each joint hypothesis in each of two or more time intervals, and maintaining a smoothed decision metric for each joint hypothesis by averaging corresponding ones of the instantaneous decision metrics over the two or more time intervals. For example, the same joint hypotheses may be considered over two or more TTIs or other transmission intervals for which channel conditions are not expected to change significantly. In each such interval, an instantaneous decision metric is computed for each joint hypothesis and averaged into a smoothed decision metric being maintained for that hypothesis. (Exponential weighting or other known filtering techniques may be used here.)

Thus, timing misalignment estimation as taught herein may use smoothed decision metrics, which are developed over a number of time intervals. For example, smoothed decision metrics may be determined over a number of transmission time slots (e.g., WCDMA TTIs). Such smoothing represents a recognition that fractional timing offsets change relatively slowly. Indeed, timing offsets arising because of delay differences in parallel transmit/receive signal chains basically are static (or at least very slowly changing). Further, even fractional timing offsets arising from delay estimation grid coarseness, and/or arising from receiver clock timing drifts, change relatively slowly over short periods of time, e.g., over the TTI timing of a WCDMA signal.

Smoothing as taught herein provides for potentially dramatic reductions in decision metric noise, and thus provides a more robust basis for evaluating the decision metrics to identify a best estimate of timing misalignment. Making better decisions regarding timing misalignments can significantly improve receiver performance, such as where the wireless communication apparatus 12 is receiving higher-order QAM signals from the base station 10 as part of High Speed Packet Access (HSPA) services.

Assume for a moment that the decision metric for slot n is denoted by $\delta(k,n)$, where the index k is associated with a particular fractional timing offset hypothesis. An improved, smoothing-based estimation of timing misalignment is implemented by (1) setting index k=0; (2) computing an instantaneous decision metric $\tilde{\delta}(k)$; (3) computing a smoothed decision metric $\delta(k,n)=\lambda\delta(k,n-1)+(1-\lambda)\tilde{\delta}(k)$; (4) if k<K, k=k+1, repeat steps 2-4; and (5) choose timing offset hypothesis that minimizes or maximizes $\delta(k,n)$. In this context, $\lambda$ is a smoothing parameter that takes a value between 0 and 1 and K denotes the number of timing offset hypotheses.

In a (channel) distance metric embodiment, for each joint hypothesis being evaluated, an effective net channel response and a corresponding instantaneous decision metric are computed in each of two or more succeeding time intervals. Based on this processing, a smoothed decision metric is maintained for each joint hypothesis by averaging the corresponding instantaneous decision metrics. The smoothed decision metrics are then evaluated to identify a best estimate of timing misalignment, meaning that the estimation process is improved over the use of potentially noisy, "single-shot" decision metrics that are not smoothed. It will be appreciated that smoothed decision metrics also may be used where the underlying instantaneous decision metrics are based on other than channel distances, such as where signal quality metrics are used. The use of decision metric smoothing is advantageous for estimating processing delay misalignment both for flat channels and for dispersive channels.

As a further point regarding the advantageous teachings presented herein, one should understand that timing offset is a common quantity per TX/RX antenna pair. However, due to the timing resolution of the grid used to report delays, the effective timing offset may be different for individual actual paths 44 of a dispersive channel. One may refer back to FIG. 4 momentarily for an illustration of this circumstance in a three-tap channel example. There, a path searcher or other such processing element estimated a set 45 of path delays 46, where the actual timing misalignment θx between the estimated path delay 46 and the corresponding actual path delay 44 varies for each estimated path delay 46.

As can be seen, the actual timing offsets have different magnitudes and signs (leading or lagging). The most general way to determine each timing offset is to hypothesize a set 50 of fractional timing offsets 48 for each estimated path delay 46 (channel tap). For example, the wireless communication apparatus 12 may hypothesize each set 50 to include some number M of fractional timing offsets 48. With that, the wireless communication apparatus 12 searches over all combinations of fractional timing offsets 48. In other words, each fractional timing offset hypothesis is jointly formed across the sets 50 of fractional timing offsets 48, as a combination of individual fractional timing offsets 48, with a member from each such set 50.

While this requires $M^L$ evaluations of the decision metric for an L tap channel, the overall process is not overly complicated for a simple decision metric or a lightly dispersive channel with few taps. In at least one embodiment, the wireless communication apparatus 12 uses a Euclidean distance measure as the decision metric. To form this type of decision metric, a measured net channel response $\hat{h}$, as observed for the received signal, and a jointly reconstructed effective net channel response $\tilde{h}_{k_1 \ldots k_L}$ are needed. Here, $\hat{h}$ may be determined as the net channel coefficients estimated from pilot symbols and $\tilde{h}_{k_1 \ldots k_L}$ represents the reconstructed net channel coefficients where hypothesis $k_1$ corresponds to channel tap 1, hypothesis $k_2$ corresponds to channel tap 2, . . . , and hypothesis $k_L$ corresponds to channel tap L. A different $\tilde{h}_{k_1 \ldots k_L}$ is computed for each hypothesis combination $k_1 k_2 \ldots k_L$. The relationship between these two quantities is $$\tilde{h}_{k_1 \ldots k_L} = B_{k_1 \ldots k_L}(B_{k_1 \ldots k_L}{}^H B_{k_1 \ldots k_L})^{-1} B_{k_1 \ldots k_L}{}^H \hat{h}, \qquad \text{Eq. (1)}$$

where $B_{k_1 \ldots k_L}$ is a conversion matrix that converts medium channel coefficients to net channel coefficients. (Net coefficients consider the effects of transmit and receive filters, as well as the radio propagation channel, while medium coefficients consider the radio propagation channel.) Assuming the processing delays to be used by the wireless communication apparatus 12, e.g., G-Rake finger delays, are from the ordered set $[d_1, d_2, \ldots, d_N]$, and the estimated path delays 46 are from the ordered set $[\tau_1, \tau_2, \ldots, \tau_L]$, entries of $B_{k_1 \ldots k_L}$ are given by $$B_{k_1 \ldots k_L} \begin{bmatrix} R_p(d_1 - \tau_1 - \theta_{k_1}) & R_p(d_1 - \tau_2 - \theta_{k_2}) & \ldots & R_p(d_1 - \tau_L - \theta_{k_L}) \\ R_p(d_2 - \tau_1 - \theta_{k_1}) & R_p(d_2 - \tau_2 - \theta_{k_2}) & \ldots & R_p(d_2 - \tau_L - \theta_{k_L}) \\ \vdots & \vdots & \ddots & \vdots \\ R_p(d_N - \tau_1 - \theta_{k_1}) & R_p(d_N - \tau_2 - \theta_{k_2}) & \ldots & R_p(d_N - \tau_L - \theta_{k_L}) \end{bmatrix}. \qquad \text{Eq. (2)}$$

In Eq. (2), $\theta_{k_j}$ is the timing offset hypothesis associated with the estimated path delay, l, $k_l$ indexes the timing offset hypothesis and is an integer than ranges from 0 to M−1, the function $R_p(\phi)$ represents the convolution of the transmit and receive filters evaluated at $\phi$, and N≧L (meaning that there are more available processing delays than estimated path delays 46). The wireless communication apparatus 12 makes use of Eq. (1) and Eq. (2) in the following procedure to obtain a best estimate of timing misalignment: (1) form a list of all combinations of fractional timing offsets 48 across the sets 50 of fractional timing offsets—i.e., form a list of hypothesized combinations of fractional timing offsets 48 across the sets 50 (denote list size as G (=$M^L$)); (2) set index g=0; (3) extract timing offset hypothesis combination associated with $g^{th}$ entry of hypothesis list; (4) compute reconstructed net channel coefficients (effective net channel response) for the timing offset hypothesis combination g by forming conversion matrix $B_{k_1 \ldots k_L}$ from Eq. (2), and then employing Eq. (1); (5) compute the instantaneous decision metric $\tilde{\delta}(g)$ via $\tilde{\delta}(g)=|\hat{h}-\tilde{h}_{k_1 \ldots k_L}|^2$; (6) compute the smoothed decision metric $\delta(g,n)=\lambda\delta(g,n-1)+(1-\lambda)\tilde{\delta}(g)$; (7) if g<G, g=g+1, repeat steps 3-7; and (8) select the fractional timing offset hypothesis from the list that has the combination of fractional timing offsets 48 that minimizes $\delta(g,n)$.

The most general case of joint timing offset estimation described above involves a potentially large number of combinations of fractional timing offsets 48. However, the wireless communication apparatus 12 is configured in one or more embodiments to consider the special case where the best/most accurate fractional timing offset 48 is the same for all paths (i.e., $\theta_{k_j}=\theta_k$). This situation can arise in practice if the TX and RX offsets are static and the delay estimation reporting grid is sufficiently fine. In this special case, the number of timing offset combinations reduces to M, so the procedure described above still holds provided that $\theta_{k_j}$ is replaced with $\theta_k$ in Eq. (2).

The above special case of a common fractional timing offset reduces the complexity of joint hypothesis formation. However, for the more general case of multiple effective timing offsets, there are other approaches to configuring the wireless communication apparatus 12 for reduced computational complexity.

In one embodiment, the wireless communication apparatus 12 is configured to reduce computational complexity by reducing the number of jointly formed hypotheses it must consider. It does so by limiting timing misalignment estimation to fewer than all L estimated delay paths 46. For example, it may estimate timing misalignment only for Q most significant ones of the L estimated delay paths 46. (Q<L). The remaining paths would be assumed to have no timing offset.

A significant path may be determined by applying a threshold to the path searcher/delay estimator power delay profile (PDP) and selecting paths with powers above the threshold as significant paths. Alternatively, the wireless communication apparatus 12 is configured to select the Q strongest paths.

In either case, the definition of the conversion matrix changes to $$B_{k_1 \ldots k_Q} \begin{bmatrix} R_p(d_1 - \tau_1 - \theta_{k_1}) & \ldots & R_p(d_1 - \tau_Q - \theta_{k_Q}) & R_p(d_1 - \tau_{Q+1}) & \ldots & R_p(d_1 - \tau_L) \\ \vdots & & \vdots & \vdots & & \vdots \\ R_p(d_N - \tau_1 - \theta_{k_1}) & \ldots & R_p(d_N - \tau_Q - \theta_{k_Q}) & R_p(d_N - \tau_{Q+1}) & \ldots & R_p(d_N - \tau_L) \end{bmatrix} \qquad \text{Eq. (3)}$$

and the jointly reconstructed effective net channel response becomes $$\tilde{h}_{k_1 \ldots k_Q} = B_{k_1 \ldots k_Q}(B_{k_1 \ldots k_Q}{}^H B_{k_1 \ldots k_Q})^{-1} B_{k_1 \ldots k_Q}{}^H \hat{h}. \qquad \text{Eq. (4)}$$

Accordingly, the simplified procedure for determining timing misalignment becomes: (1) form a list of all combinations of timing offset hypotheses (denote the list size as G (=$M^Q$)); (2) set hypothesis list index g=0; (3) extract timing offset hypothesis combination associated with $g^{th}$ entry of hypothesis list; (4) jointly reconstruct the effective net channel response for timing offset hypothesis g by forming conversion matrix $B_{k_1 \ldots k_Q}$ from Eq. (3), and then employing Eq. (4); (5) compute instantaneous decision metric $\tilde{\delta}(g)$ via $\tilde{\delta}(g)=|\hat{h}-\tilde{h}_{k_1 \ldots k_Q}|^2$; (6) compute smoothed decision metric $\delta(g,n)=\lambda\delta(g,n-1)+(1-\lambda)\tilde{\delta}(g)$; (7) if g<G, g=g+, repeat steps 3-7; and (8) select fractional timing offset hypothesis from list that minimizes $\delta(g,n)$.

In another embodiment that reduces computational complexity, the wireless communication apparatus 12 is configured to perform an ordered search. That is, the "best" fractional timing offset 48 for a single estimated delay path 46 is searched for while keeping all other fractional timing offsets 48 fixed. Viewed another way, assuming that the timing misalignment is being determined for more than one estimated delay path 46, the wireless communication apparatus 12 is configured to determine the particular fractional timing offset 48 from the set 50 of fractional timing offsets 48 established for a given one of the paths independently from the determinations made assuming fixed or known offsets for the other paths.

To start the ordered search processing, the fractional timing offset for all estimated delay paths 46 is set to 0. (Note that each set 50 of fractional timing offsets 48 may include a zero-offset member that is aligned with the corresponding estimated path delay 46.) Then, a given path delay 46 of interest is selected, and all M possible offset hypotheses are evaluated for that path delay. For example, if the set 50 of fractional timing offsets 48 established for that path includes seven offsets, then seven hypotheses are evaluated. The hypothesis with the smallest decision metric is chosen as the correct hypothesis and the corresponding fractional timing offset 48 is assigned to that path and fixed for the remainder of the search. The procedure continues by selecting another estimated delay path 46 that is of interest, and again evaluating all M possible offset hypotheses for that path. This continues until all paths are exhausted (ML combinations evaluated) or until all significant paths are exhausted (MQ combinations). In this context, the conversion matrix when searching for the timing offset corresponding to the I-th delay path is given by $$B_{k_l} = \begin{bmatrix} R_p(d_1 - \tau_1 - \hat{\theta}_{k_1}) & \cdots & R_p(d_1 - \tau_{l-1} - \hat{\theta}_{k_{l-1}}) & R_p(d_1 - \tau_l - \theta_{k_l}) & R_p(d_1 - \tau_{l+1}) & \cdots & R_p(d_1 - \tau_L) \\ \vdots & & \vdots & \vdots & \vdots & & \vdots \\ R_p(d_N - \tau_1 - \hat{\theta}_{k_1}) & \cdots & R_p(d_N - \tau_{l-1} - \hat{\theta}_{k_{l-1}}) & R_p(d_N - t_l - \theta_{k_l}) & R_p(d_N - \tau_{l+1}) & \cdots & R_p(d_N - \tau_L) \end{bmatrix},$$

Eq. (5)

and the reconstructed net channel coefficients become $$\tilde{h}_{k_l} = B_{k_l}(B_{k_l}^H B_{k_l})^{-1} B_{k_l}^H \hat{h}.$$ Eq. (6)

In Eq. (5), $\theta_{k_j}$ represents the estimated fractional timing offset hypothesis for channel delay j. Given Eq. (5) and Eq. (6), the procedure for the ordered searching embodiment is: (1) set path index l=1; (2) set the timing offset hypotheses $\theta_{k_j}=0$ for j=2 ... L; (3) set hypothesis index m=0; (4) compute effective net channel response given the already determined fractional timing offsets $\hat{\theta}_{k_j}$ for j=1 ... l−1 and the chosen m-th timing offset hypothesis for delay l by forming conversion matrix $B_{k_l}$ from Eq. (5), and then employing Eq. (6); (5) compute instantaneous decision metric $\tilde{\delta}_l(m)$ via $\tilde{\delta}_l(m)=|\hat{h}-\tilde{h}_{k_l}|^2$; (6) compute smoothed decision metric $\delta_l(m,n)=\lambda\delta_l(m,n-1)+(1-\lambda)\tilde{\delta}_l(m)$; (7) if m<M, m=m+1, repeat steps 4-7; (8) choose offset hypothesis that minimizes $\delta_l(m,n)$ as $\hat{\theta}_{k_l}$; and (9) if l≦L (when searching all paths) or if l≦Q (when searching only Q strongest paths), l=l+1 and repeat steps 3-9.

The above processing can be understood as zeroing or otherwise holding fixed the fractional timing offsets 48 hypothesized for other estimated path delays 46, while stepping through the set 50 of fractional timing offsets 48 hypothesized for a particular one of the estimated path delay 46. "Stepping through" in this sense includes computing decision metrics, and correspondingly evaluating the decision metrics to identify a best estimate of timing misalignment for the path being processed. This per-delay processing can be carried out for as many ones of the remaining paths 46 that are of interest.

Another aspect of the teachings herein consider the advantageous placement of processing delays, e.g., Generalized Rake (G-Rake) finger placement processing or chip equalizer (CE) filter tap placement processing, in view of timing misalignment. One starting assumption is that the wireless communication apparatus 12 has a finite number of processing delays that it can set or otherwise place for coherent processing of the received signal. A placement strategy that fails to consider timing misalignment can perform poorly.

Using a G-Rake placement example, a conventional G-Rake finger placement sequence is a two-step process. First, fingers are allocated to channel delays. Then, fingers are placed on delays that are "good" for interference suppression. One or more embodiments of the wireless communication apparatus 12 are configured with an advantageous finger placement modification. In one such embodiment, first Rake fingers are placed on channel paths, e.g., on a set 45 of estimated path delays 46. Further, second Rake fingers are placed around at least significant ones of the first Rake fingers, such as by time-wise bracketing a first Rake finger with a second Rake finger on either side. Still further, third Rake fingers are placed a positions that are good for interference suppression, subject to the qualification that third fingers overlapping or too close to placed first or second Rake fingers would be omitted, and subject to the availability of Rake fingers for such use.

"Too close" in this sense may be evaluated in terms of the time spacing used to place second Rake fingers relative to the first Rake fingers. For example, the first Rake fingers may be understood as collecting desired signal energy at the path delays, while the third Rake fingers collect interfering signal energy. The second Rake fingers represent a novel approach where they are placed nearer to first Rake fingers than the third Rake fingers, and as such collect both desired and interfering signal energy. This is advantageous to the extent that the first Rake fingers bracketed by second Rake fingers are misaligned with the corresponding actual path delays 44.

For reference, one may refer to U.S. Pub. 2006/0268962 A1 for an example of identifying significant paths. Additionally, one may refer U.S. Pat. No. 6,922,434 to Wang et al., for an example of placing the above-named third Rake fingers. As a further point of understanding in this context of advantageous processing placement, one may note that the intent of the second Rake fingers, which may be thought of as a grid of additional Rake fingers around each bracketed first Rake finger, is to affect a form of interpolation as in a flat channel. The use of the modified finger placement strategy given above, along with accurate timing misalignment estimation, yields potentially significant performance improvements.

Figure 7:
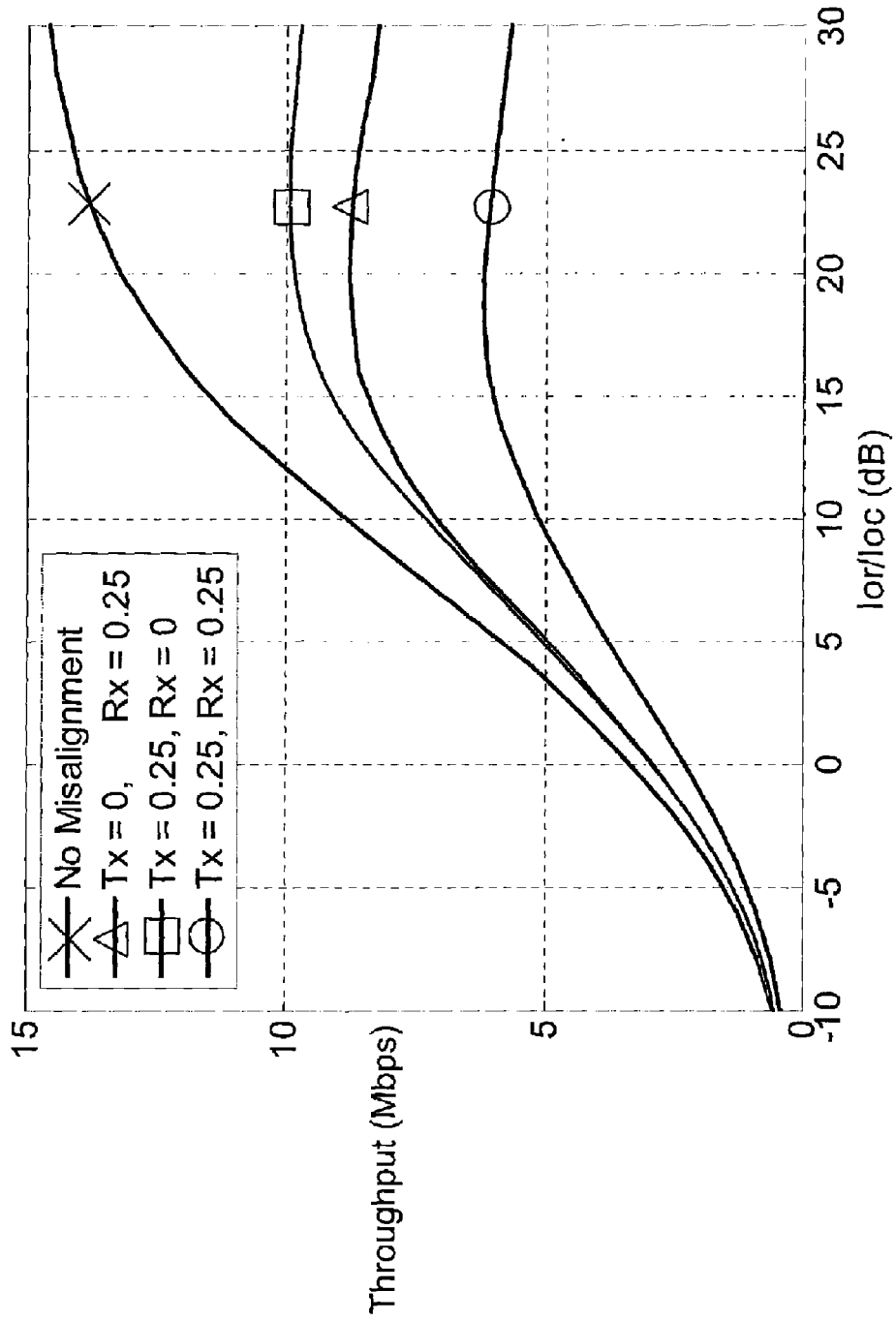
FIG. 7 is a graph of performance for a conventional Generalized Rake (G-Rake) receiver, illustrating throughput in Mbps as a function of carrier-to-interference ratio, Ior/Ioc, according to conventional finger placement and no timing offsets.

For example, FIG. 7 illustrates a conventional G-Rake receiver that employs no timing offset compensation and uses a conventional two-step finger placement strategy, such as disclosed at paragraph [0031] in the U.S. 2006/0268962 publication. Particularly, FIG. 7 shows (data) throughput in Mbps as a function of Ior/Ioc, in dB, for four scenarios, including: no misalignment, one-quarter chip receiver timing misalignment, one-quarter chip transmitter timing misalignment, and one-quarter chip timing misalignment at both the transmitter and receiver. (Here, Ior/Ioc is the carrier-to-interference ratio, where Ior is the received power at a wireless communication apparatus from its serving base station and Ioc is the received interference power at the wireless communication apparatus from other base stations plus received noise power.)

Figure 8:
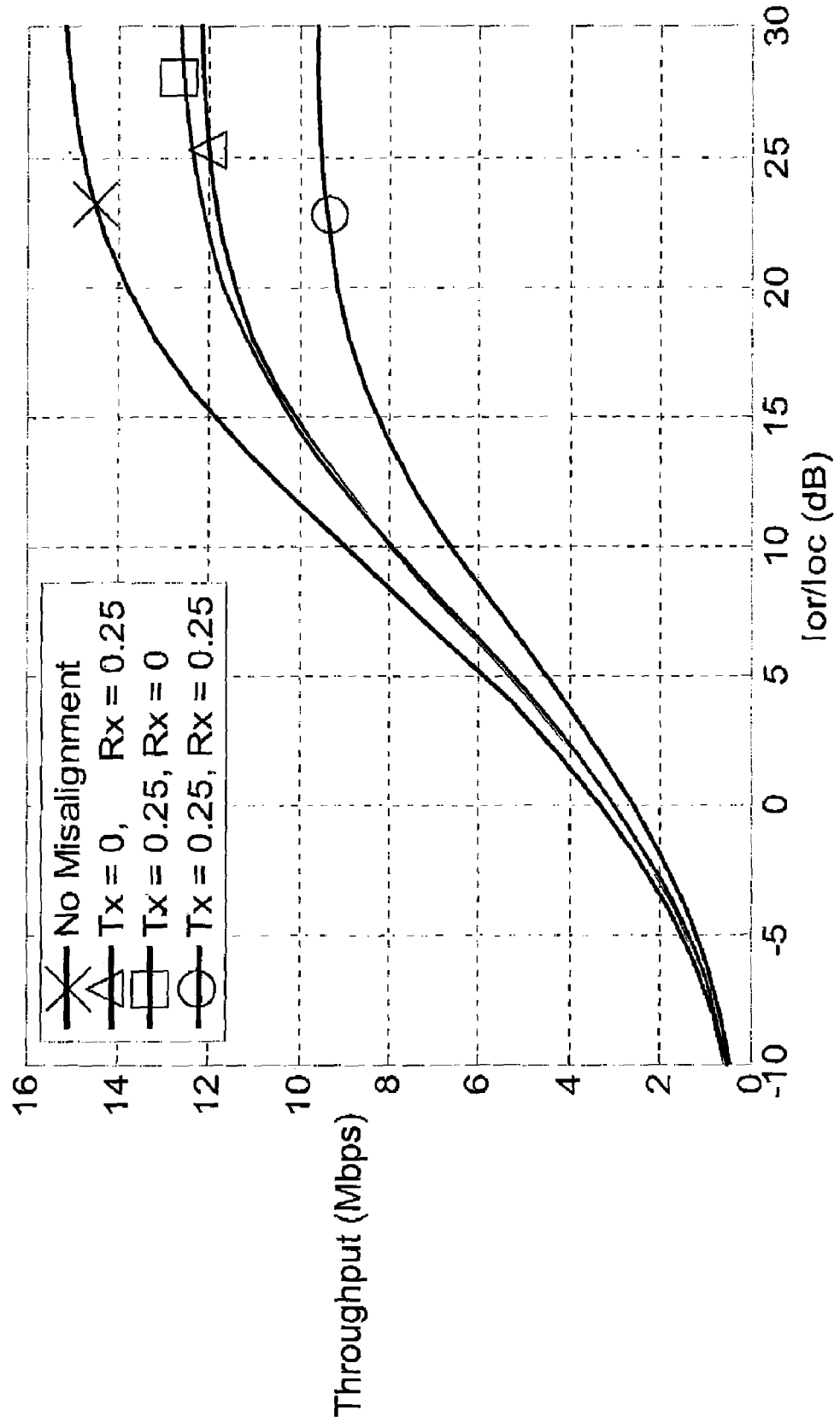
FIG. 8 is a graph of performance for a G-Rake receiver that advantageously uses timing offset correction as taught herein.
Figure 9:
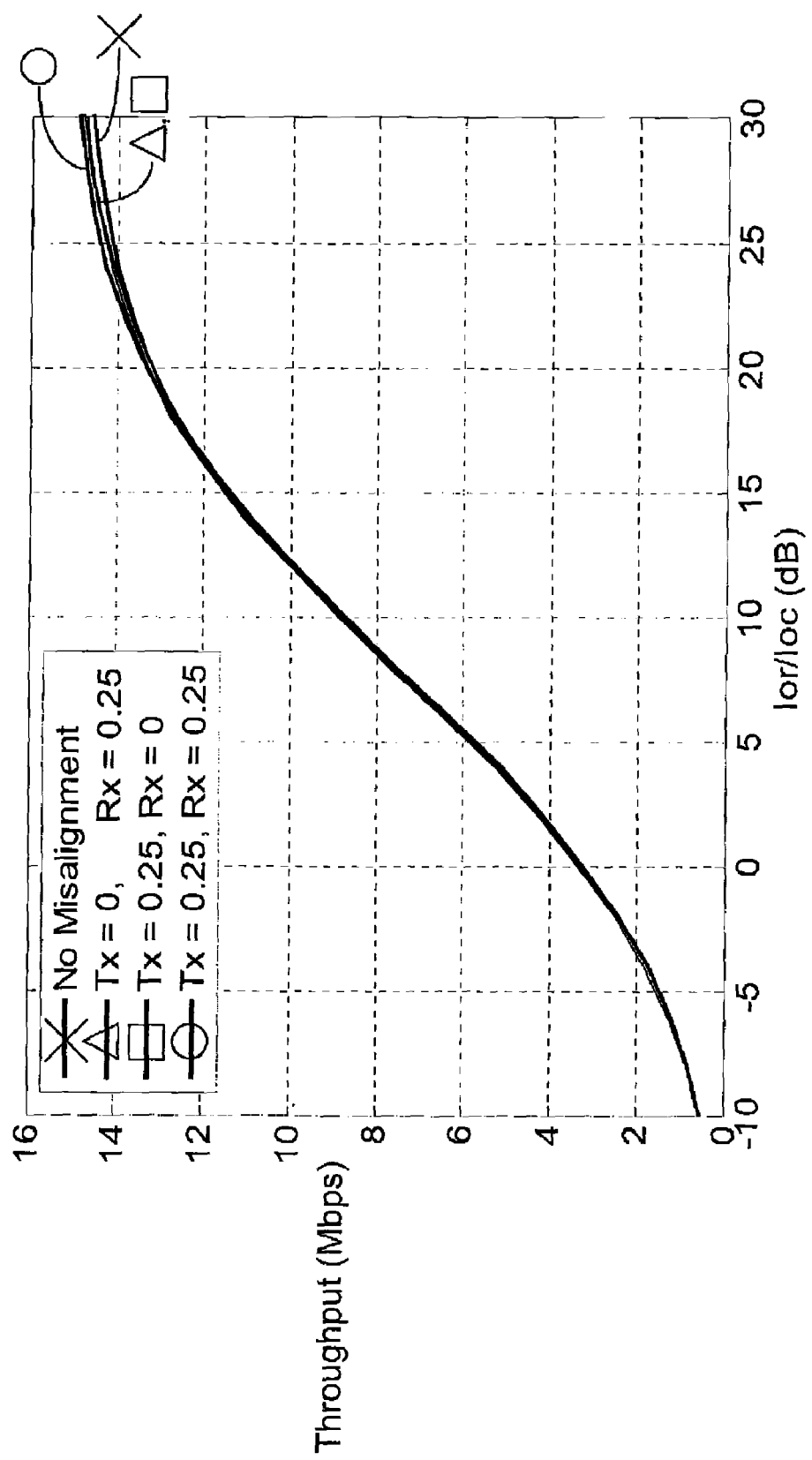
FIG. 9 is a graph of performance for a G-Rake receiver that advantageously uses timing offset correction as taught herein, along with advantageous use of finger placement processing placement as taught herein.

FIG. 8 plots performance for a G-Rake receiver that is otherwise the same as assumed in FIG. 7, except that the receiver performs compensation of coherent received signal processing based on estimating timing misalignment as taught herein. In FIG. 9, the G-Rake receiver performs compensation of coherent received signal processing (based on timing misalignment estimation as taught herein), and additional performs the advantageous finger placement processing described above.

Figure 10:
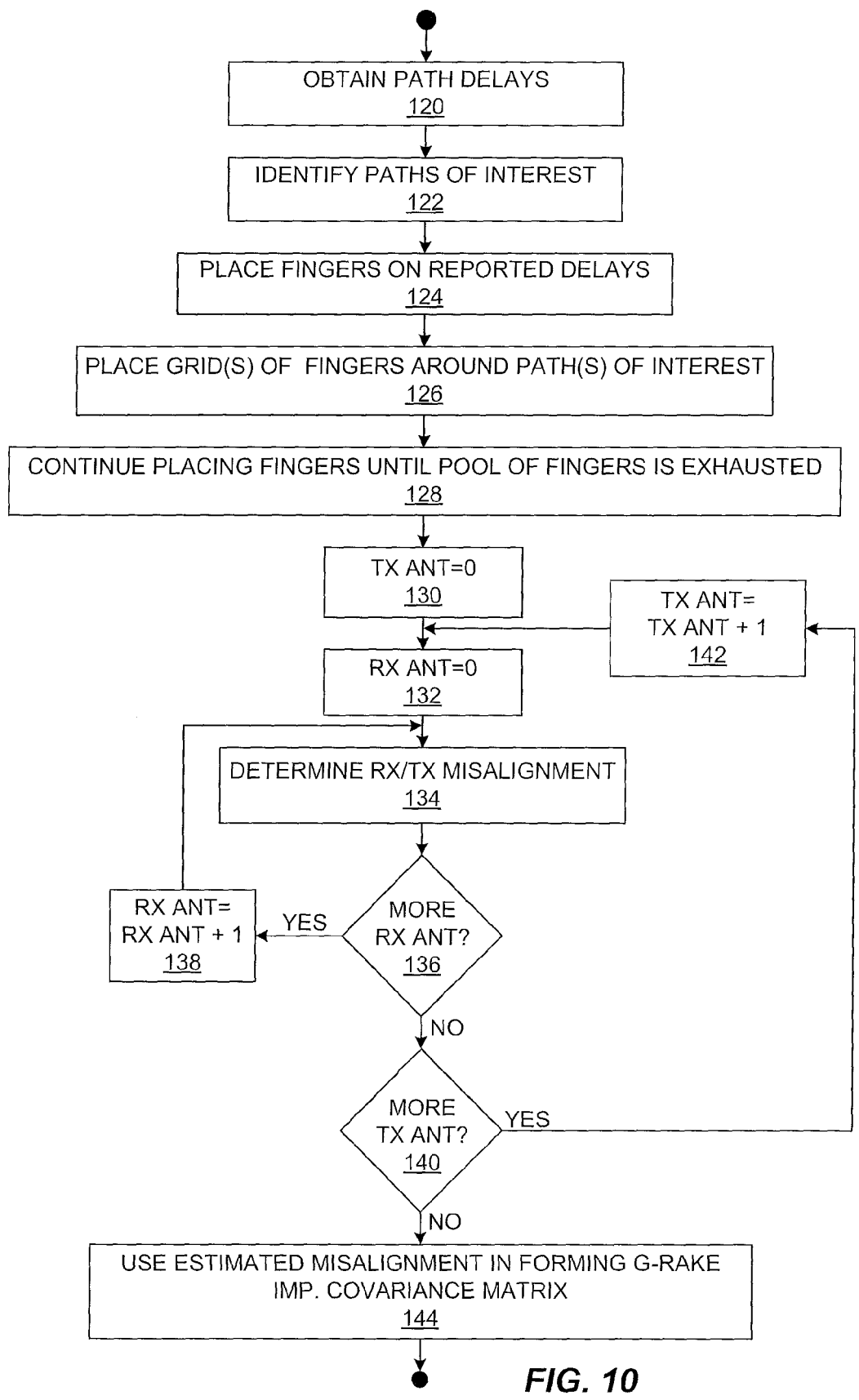
FIG. 10 is a logic flow diagram illustrating one embodiment of processing logic for implementing the G-Rake processing giving rise to the example performance shown in FIG. 9.

FIG. 10 illustrates processing logic for one embodiment of implementing G-Rake receiver processing, where advantageous finger placement is taught, and where impairment correlation calculations are compensated or determined as a function of the fractional timing offsets 48 included in the best estimate of timing misalignment. The illustrated method may be, for example, incorporated into an embodiment of the wireless communication apparatus 12 where it is adapted for operation in a 2×2 MIMO case, such as considered in Release 7 of the WCMDA standards. A conventional assumption is that the TX/RX delays are common for all TX/RX antenna pairs. However, in practice, 2×2 MIMO systems, and other types of multi-antenna transmit/receive systems, generally have different timing misalignments between different pairs of TX/RX antennas.

Assuming a reduced complexity approach is desirable for implementation, a method of compensating for timing misalignment in received signal processing is implemented in one or more embodiments as follows. The wireless communication apparatus 12 estimates path delays 46 (Block 120), and identifies one or more paths of interest from among the estimated path delays 46 (Block 122). Processing continues with placing first Rake fingers on the estimated path delays 46 (Block 124)—one first Rake finger is placed on each such reported delay.

Processing continues with bracketing one or more of the first Rake fingers with second Rake fingers. For example, the first Rake fingers lying on significant paths are bracketed. Such bracketing can be done by placing a second Rake finger on either side of such first Rake fingers. More particularly, such processing comprises in one or more embodiments placing grid(s) of second fingers around significant delay(s) (Block 126).

Processing continues with placing third Rake fingers until the available pool of fingers is exhausted (Block 128). The transmit antenna index is set to TX_ant=0 (Block 130), and the receive antenna index is set to RX_ant=0 (Block 132). The best estimate of timing misalignment is then determined for this particular TX/RX antenna pairing (Block 134). That is, processing continues with determining timing misalignment for the currently indexed TX/RX antenna pair using one of the reduced complexity methods described earlier herein, for example.

If there are more receiver antennas to consider for the currently indexed transmit antenna (Yes from Block 136), processing continues with indexing to the next receiver antenna (Block 138), and repeating the determination of timing misalignment for this next RX antenna with respect to the currently indexed TX antenna (Block 134). If there are no more RX antennas to consider (No from Block 136), processing continues with determining whether there are additional TX antennas to consider (Block 140).

If so, the transmit antenna index is advanced (Block 142), TX_ant=TX_ant+1, and processing is repeated by determining timing misalignments between all pairings of this next TX antenna and the RX antennas. If there are no more TX antennas to consider, processing continues with using the best estimates of timing misalignments, as determined for all paths of interest, for all TX/RX antenna pairings, in the computation of G-Rake impairment correlations, e.g., in the computation of an impairment covariance matrix (Block 144).

In at least one embodiment taught herein, compensating coherent processing of the received signal according to the best estimate of timing misalignment comprises calculating combining weights as a function of the fractional timing offsets included in the best estimate of timing misalignment. Such combining weights, w, are used for coherently combining signal values of the received signal obtained at the established signal processing delays, e.g., the Rake finger or CE filter tap positions set for received signal processing. In at least one such embodiment, calculating combining weights as a function of the fractional timing offsets included in the best estimate of timing misalignment comprises incorporating the fractional timing offsets into a parametric model of impairment correlations, estimating impairment correlations for the received signal according to the parametric model, and calculating the combining weights as a function of the estimated impairment correlations.

For example, a G-Rake embodiment of the wireless communication apparatus 12 implements channel estimation and (combining) weight computations using despread pilot symbols from a pilot channel of the received signal. (The received signal may include a plurality of separable channels, such as orthogonally-coded CDMA channels.) Further, one or more such G-Rake embodiments maintain a parametric impairment correlation matrix, $R_u$, used for computing combining weights. For Single-Input-Single-Output (SISO) systems with one transmit antenna and one receive antenna, and for Single-Input-Multiple-Output (SIMO) systems with one transmit antenna and more than one receive antenna, a non-limiting example of such a parametric model is given as $$R_u = \alpha R_I + \beta R_n, \quad \text{Eq. (7)}$$

where the interference matrix ($R_I$) captures the effect of own-cell interference, while the white noise matrix ($R_n$) models the effect of other-cell interference plus thermal noise. Note that the scaling parameters α and β reflect the relative contribution of own-cell versus other-cell interference plus noise. Further, note that similar parametric models can be developed for MIMO systems. Additional example details for parametric estimation can be found in Fulghum, T.; Cairns, D.; Bottomley, G. E.; Cozzo, C., "Low Complexity Parameter Estimation for the Multi-antenna Generalized Rake Receiver," Vehicular Technology Conference, 2006. VTC 2006-Spring. IEEE 63rd, vol. 4, no., pp. 1874-1878, 7-10 May 2006. Further example details for parametric estimation with particular applicability to MIMO systems can be found in the commonly assigned and co-pending U.S. patent application, identified by application Ser. No. 12/036,323, entitled "Receiver Parametric Covariance Estimation for Precoded MIMO Transmissions," and filed on 25 Feb. 2008.

The parametric model of Eq. (7) may be maintained in memory as corresponding data structures and associating functional processing routines. In operation, a number of channel taps are estimated and the model terms $R_I$ and $R_n$ are fitted, for example, to pilot-based observations of impairment correlation by adapting the scaling parameters α and β in a least-squares fitting process based on $$R_{measured} \approx R_u = \alpha R_I + \beta R_n, \quad \text{Eq. (8)}$$

where α and β are adapted.

For an example of a model fitting parameter calculation based on short-term estimations of the noise correlations as determined from despread pilot values, one may refer to the co-owned U.S. Pub. No. 2005/0201447 to Cairns et al., entitled "Method and apparatus for parameter estimation in a generalized rake receiver," which corresponds to U.S. application Ser. No. 10/800,167, filed on 12 Mar. 2004 and entitled, "Method and Apparatus for Parameter Estimation in a Generalized RAKE Receiver." The '167 application is incorporated herein by reference.

Continuing, then, combining weights w used for combining signal values across G-Rake fingers or across CE filter taps may be computed as $$w = R_u^{-1} \hat{h}. \quad \text{Eq. (9)}$$

Note, too, that $\tilde{h}$ can be used to determine the combining weights with compensation for timing misalignment. On this point, the jointly reconstructed effective net channel response $\tilde{h}$ is calculated as a function of the conversion matrix B, which in turn is calculated as a function $R_p(\phi)$, representing the convolution of the transmit and receive filters evaluated at $\phi$. As taught herein, the value of $\phi$ is compensated for the fractional timing offset(s) 48 associated with the best estimate of timing misalignment. As such, the convolution calculation is better representative of the actual path delays 44, at least for those estimated delay paths 46 for which timing misalignment is estimated. See, for example, the representation of those fractional timing offsets 48 as $\theta_{k_x}$ in Eq. (2).

Thus, the teachings herein provide for a compensated convolution function $R_p(\phi)$, that is improved over conventional transmit/receiver filter convolutions by incorporating the fractional timing offset(s) 48 included in the best estimate of timing misalignment. Doing so provides a convolution result that accounts for estimated fractional timing misalignments between actual path delays 44 and estimated path delays 46, as used for setting received signal processing delays. In one or more embodiment, the compensated convolution function $R_p(\phi)$ yields an improved estimation of impairment correlation. That is, in one or more embodiments taught herein, compensating coherent processing of the received signal according to the best estimate of timing misalignment at least includes compensation of impairment correlation estimation. For example, in one or more embodiments, at least the parametric model term $R_I$ from Eq. (7) is dependent on the best estimate timing of timing misalignment. This may be achieved by determining compensated medium coefficients and compensated channel delays that correspond to the best estimate of timing misalignment.

Let $\tilde{h}_{best}$, $B_{best}$, and $\theta_{best}$ represent the net channel coefficient vector, conversion matrix, and timing offset vector corresponding to the timing offset hypothesis that minimized (maximized) the distance metric (signal quality metric) according to the procedure given previously. Define compensated medium channel coefficients and channel delays as $$\tilde{g}_{best} = (B_{best}^H B_{best})^{-1} B_{best}^H \tilde{h}_{best}, \text{ and} \quad \text{Eq. (1)}$$

$$\tau_{best} = \tau_{best} + \theta_{best}. \quad \text{Eq. (2)}$$

These compensated values can be used along with $$R_I(d_1, d_2) = \sum_{l=0}^{L-1} \sum_{q=0}^{L-1} \tilde{g}_{l,best} \tilde{g}_{q,best}^* \quad \text{Eq. (3)}$$

$$\sum_{m=-\infty, m\neq 0}^{m=\infty} R_p(d_1 - mT_c - \tilde{\tau}_{l,best}) R_p^*(d_2 - mT_c - \tilde{\tau}_{q,best})$$

to calculate the interference portion of the impairment covariance matrix. Thus, the estimation of interference correlations, as represented by the interference correlation matrix $R_I$, benefits from adjusting inter-delay differences according to the combination of fractional timing offsets included in the best estimate of timing misalignments, as taught herein.

Figure 11:
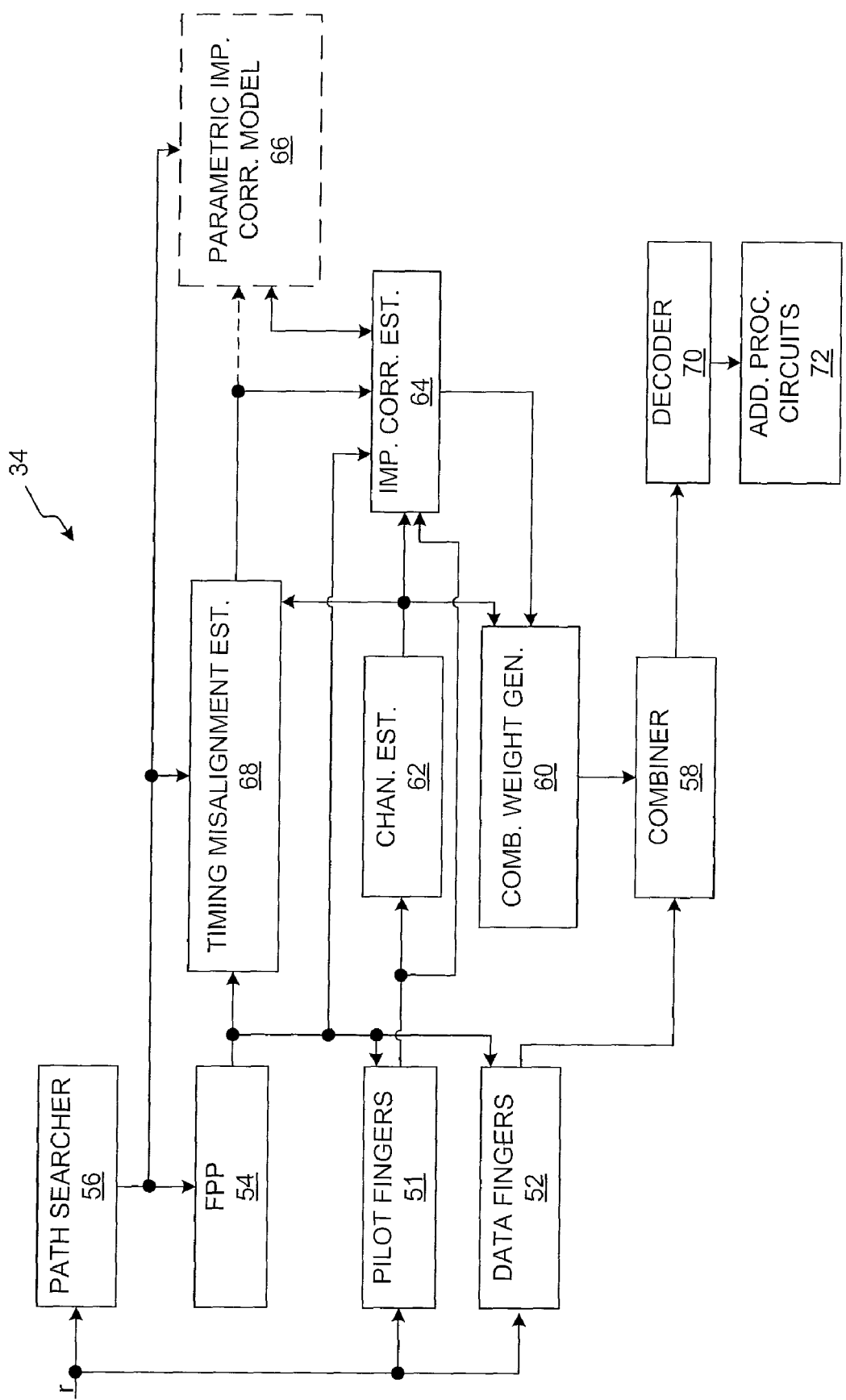
FIG. 11 is a block diagram of a G-Rake receiver embodiment of the wireless communication apparatus for use in the wireless communication apparatus of FIG. 1, for example.

Turning to implementation details, FIG. 11 illustrates one embodiment of a G-Rake implementation of the wireless communication receiver 12, and serves as a non-limiting example for functional processing circuits that may be implemented via hardware and/or software within the one or more processing circuits 32 of the wireless communication apparatus. Particularly, FIG. 11 presents a non-limiting example of a G-Rake receiver configuration for the linear equalization receiver 34 implemented by the one or more processing circuits 32. Note that channel-based decision metrics are used in the following example, but signal quality or other types of decision metrics could be used, as needed or desired.

The G-Rake implementation includes pilot Rake fingers 51, data Rake fingers 52 (which may not be type specific, but rather assigned from a larger pool of fingers one or the other of pilot spreading codes or traffics spreading codes), a finger placement processor (FPP) 54, a path/delay searcher 56, a combiner 58, a combining weight generator 60, a channel estimator 62, an impairment correlation estimator 64 having access to a stored impairment correlation model 66, and a timing misalignment estimator 68. These circuits may be associated with or otherwise include a decoder 70 for decoding data, and one or more additional processing circuits 72, for processing decoding data.

In operation, the path/delay searcher 56 processes a received signal r, which may comprise one or more streams of digital signal values corresponding to antenna-received signal(s), as produced by the RX front-end 28 shown in FIG. 1. The path/delay searcher 56 uses a first defined timing resolution, e.g., a defined timing grid, to estimate path delays 46. The searcher output, which may be a Power Delay Profile (PDP) indicating the strongest correlation peaks recorded for the received signal, is used by the FPP 54 to locate pilot and data fingers 51 and 52. In particular, the FPP 54 in one or more embodiments places first data fingers 52 on the estimated path delays 46 as reported by the searcher 56 as well as off-path fingers for the purpose of interference suppression. The FPP 54 also places pilot fingers 51 in identical locations as the data fingers 52 for the purposes of channel estimation (by the channel estimator 62) and for impairment correlation determination by the impairment correlation estimator 64.

The timing misalignment estimator 68 determines a best estimate of timing misalignment for one or more of the estimated path delays 46, e.g., for one or more most significant ones of those reported delays. The fractional timing offsets 48, which may be expressed as digital values representing fractional offsets in time from the delay values at the estimated path delays 46, are provided to the impairment correlation estimator 64, for example, for its use in estimating an impairment covariance matrix from the parametric model 66.

Figure 12:
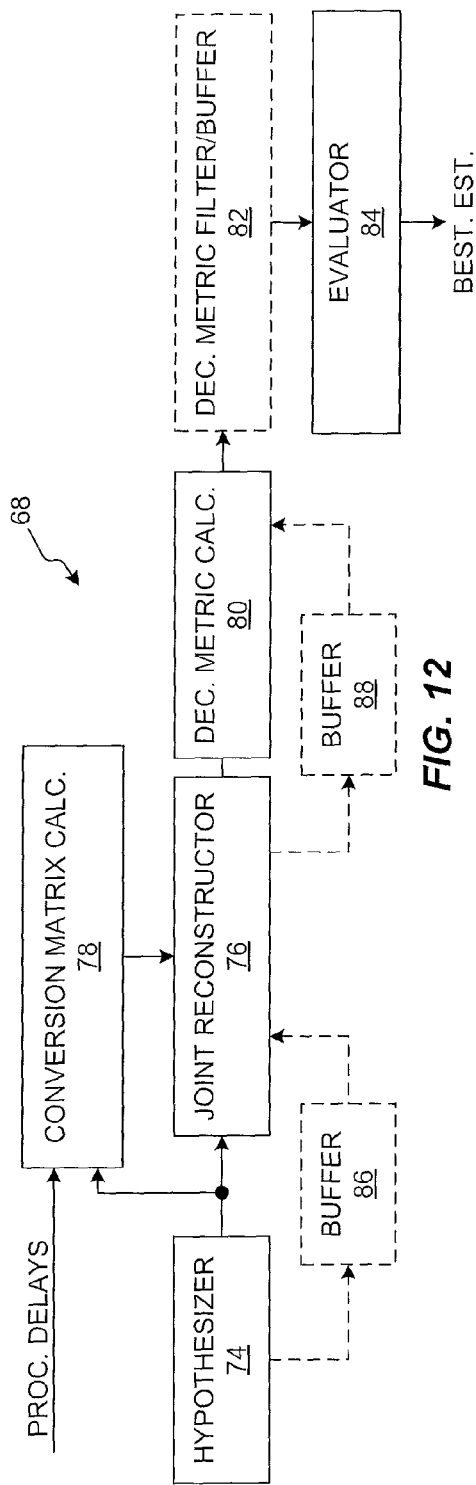
FIG. 12 is a block diagram of one embodiment of functional circuits, such as may be implemented in the wireless communication apparatus of FIG. 1, for estimating timing misalignment as taught herein.

As one example, FIG. 12 illustrates a non-limiting embodiment of the fractional timing offset estimator 68. The illustrated embodiment includes a hypothesizer 74, a joint reconstructor 76, a conversion matrix calculator 78, a decision metric calculator 80, an optional decision metric smoothing filter/buffer 82, and a (decision metric) evaluator 84.

In operation, the hypothesizer 74 hypothesizes a combination of fractional timing offsets 48 for each of two or more estimated path delays 46 of interest. For example, it may define a set 50 of fractionally-spaced timing offsets around each estimated delay path 46 of interest, and form joint hypotheses as different combinations of fractional timing offsets 48, as selected from the sets 50. Each such combination is formed by taking a particular combination of members of from the sets 50 of fractional timing offsets 48 that are being considered.

The joint reconstructor 76 jointly reconstructs an effective net channel response for each joint hypothesis, where that response is computed in joint consideration of all the estimated delay paths 46 as a dispersive channel. (Hypotheses such as represented by corresponding lists/data structures may be held in memory, e.g., in buffer 86, for processing. The conversion matrix calculator 78 provides the conversion matrix B, as described earlier herein, for converting from medium to net channel response. The decision metric calculator 80 calculates decision metrics for all joint hypotheses, as described earlier herein. For example, each effective net channel response (calculated for a particular joint hypothesis) may be buffered in buffer 88 for processing by the decision metric calculator 80.) The decision metrics may be filtered/buffered in a filter/buffer 82, such that smoothed decision metrics are provided to the evaluator 84.

In turn, the evaluator 84 evaluates the decision metrics to identify the best estimate of timing misalignment. In this sense, the evaluator 84 identifies the best decision metric. The best decision metric thus corresponds to a best effective net channel response, which in turn corresponds to best combination of fractional timing offsets 48. In embodiments using signal quality based metrics, the best combination of fractional timing offsets corresponds to the best signal quality metric. In any case, the best fractional timing offsets 48 are used as described earlier herein to compensate for the transmit/receiver filter convolution computation, etc.

Figure 13:
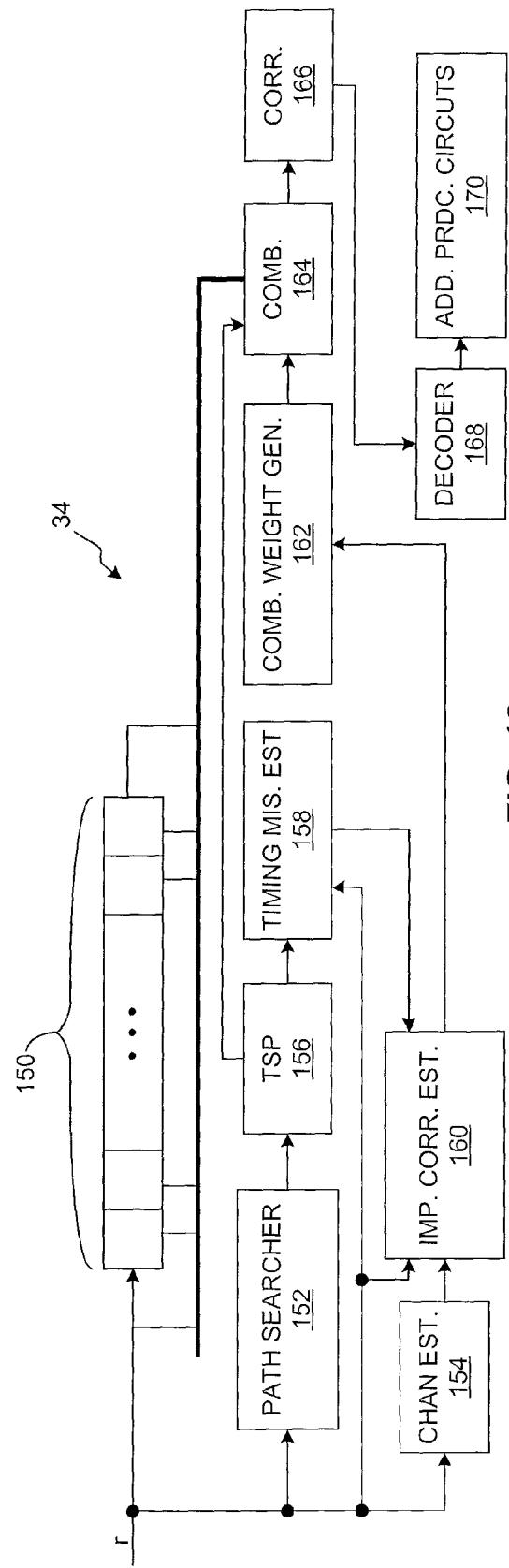
FIG. 13 is a block diagram of a chip equalizer (CE) receiver embodiment of the wireless communication apparatus for use in the wireless communication apparatus of FIG. 1, for example.

Of course, such processing is not limited to G-Rake embodiments, and FIG. 13 illustrates a non-limiting CE receiver implementation for the one or more processing circuits 32 of the wireless communication apparatus 12. The illustrated CE receiver, which may be implemented in hardware, software, or some combination thereof, includes a serial delay register 150, a path/delay searcher 152, a channel estimator 154, a tap selection processor 156, a timing misalignment estimator 158, an impairment correlation estimator 160 (which may use a parametric model as shown in FIG. 12), a combining weight generator 162, a combiner 164, and a correlator 166. These circuits may be associated with or further include a decoder 168 and one or more additional processing circuits 170 for processing decoded data.

Operation is similar to the G-Rake embodiment of FIG. 11, except that the tap selection processor (TSP) 156 places or otherwise selects filter taps rather than finger delays, as is done for G-Rake processing. That is, the processing delays set for received signal processing in the CE embodiment are determined by selecting which delay stage outputs from the serial delay register 150 will be weighted via combining weights w from combining weight generator 162, and then combined in combiner 164. (Here, the combining weights are digital filter coefficients for weighting tap outputs from the selected taps, and the correlator 166 decorrelates the weighted combination signal output from the combiner 164 to obtain demodulated data of interest for decoding.)

With these and other example variations in mind, those skilled in the art should appreciate that the teachings herein broadly provide for a method of compensating for processing timing misalignment in a communication receiver. In one or more embodiments, the method includes estimating path delays for a received signal according to a first timing resolution, and estimating timing misalignment between one or more first processing delays placed on those estimated path delays and corresponding actual path delays. Estimating timing misalignment includes, in one or more embodiments, jointly hypothesizing combinations of fractional timing offsets for two or more of the first processing delays, and computing a decision metric for each joint hypothesis. The method also includes evaluating the decision metrics to identify a best estimate of timing misalignment for the one or more estimated path delays, and compensating coherent processing of the received signal according to the best estimate of timing misalignment.

In one or more embodiments of the method, processing further includes bracketing of first processing delays with second processing delays, such as by placing second Rake fingers one either side of first Rake fingers or by selecting second CE filter taps on either side of first CE filter taps. Doing so provides for high-resolution interpolation processing between a given first processing delay and its associated second processing delays. Such interpolation therefore can be fine-tuned in the sense that the fractional timing offsets advantageously can be determined at an essentially arbitrary mathematical resolution according to teachings herein. That is, the fractional spacing used for hypothesizing actual versus estimated path delays can be made as small as desired, within the computational and processing limitations of the apparatus used to implement the method.

As a particular G-Rake example, the method may include setting a first processing delay on each estimated path delay by placing a first Rake finger of a Generalized Rake receiver on each estimated path delay. Bracketing at least one of the first processing delays with second processing delays includes, for each first Rake finger to be bracketed, placing at least one second Rake finger at a defined placement offset on either side, to determine or otherwise estimate timing misalignment. As a further placement strategy, the method may include placing one or more third Rake fingers at defined placement offsets relative to one or more of the first Rake fingers. These third placement offsets may be used for impairment characterization, and may use the same timing grid as used for estimating path delays, but may be controlled so that third Rake fingers are not placed on or within one or more grid positions of first or second Rake fingers.

As a particular CE example, setting a first processing delay on each estimated path delay includes selecting first chip equalization filter taps corresponding to the set of estimated path delays. Here, bracketing at least one of the first processing delays with second processing delays includes, for each first filter tap to be bracketed, selecting at least one second filter tap at a defined offset on either side of the first filter tap.

Still further, in at least one embodiment, the method includes estimating timing misalignment for each of two or more transmit/receive antenna pairings. Further, one or more embodiments of the method include computing the decision metrics as smoothed decision metrics wherein, for each joint hypothesis, a corresponding instantaneous decision metric is computed in each of two or more succeeding time intervals, and a smoothed decision metric is maintained for that joint hypothesis by averaging the instantaneous decision metrics. The instantaneous decision metrics may be computed as signal quality metrics, for example, or as distance metrics representing distances between the measured net channel responses and the effective net channel responses.

Further, as described earlier herein, one or more embodiments of the method compensate coherent processing of the received signal by calculating combining weights as a function of the fractional timing offsets included in the best estimate of timing misalignment. As discussed, these combining weights are used for coherently combining signal values of the received signal obtained at the first and second processing delays in a linear equalization process. For example, see combining weight generator 60 and combiner 58 of FIG. 11 as a G-Rake example, and see combining weight generator 162 and combiner 164 of FIG. 13 as CE example.

In general, calculating combining weights as a function of the fractional timing offsets included in the best estimate of timing misalignment includes, for one or more method embodiments, incorporating the fractional timing offsets into a parametric model of impairment correlations, estimating impairment correlations for the received signal according to the parametric model, and calculating the combining weights as a function of the estimated impairment correlations. Also, as taught for one or more method embodiments, jointly reconstructing an effective net channel response over the set of path delays for each fractional timing offset hypothesis includes computing the effective net channel response as a function of the measured net channel response and a conversion matrix. The conversion matrix converts medium channel responses to net channel responses. As taught herein, the elements of the conversion matrix comprise transmit/receive filter convolution values calculated for differences among the set of estimated path delays, as adjusted according to the fractional timing offsets included in the best estimate of timing misalignment.

As such, the present invention is not limited to the foregoing discussion and accompanying drawings. Instead, the present invention is limited only by the following claims and their legal equivalents.

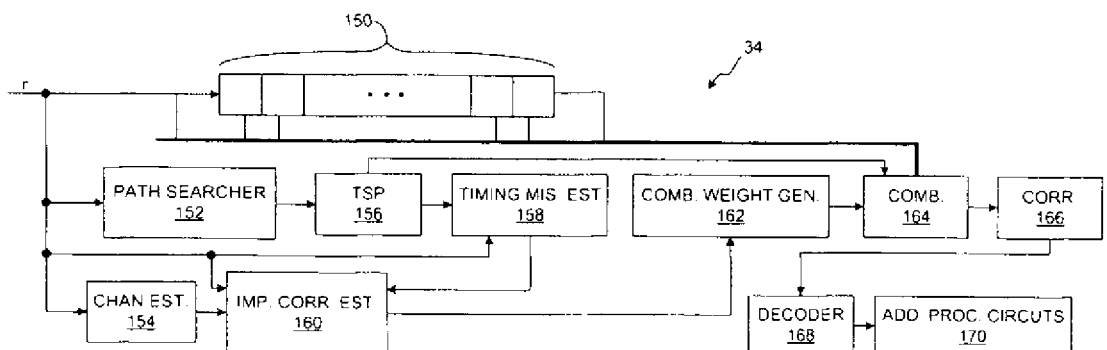

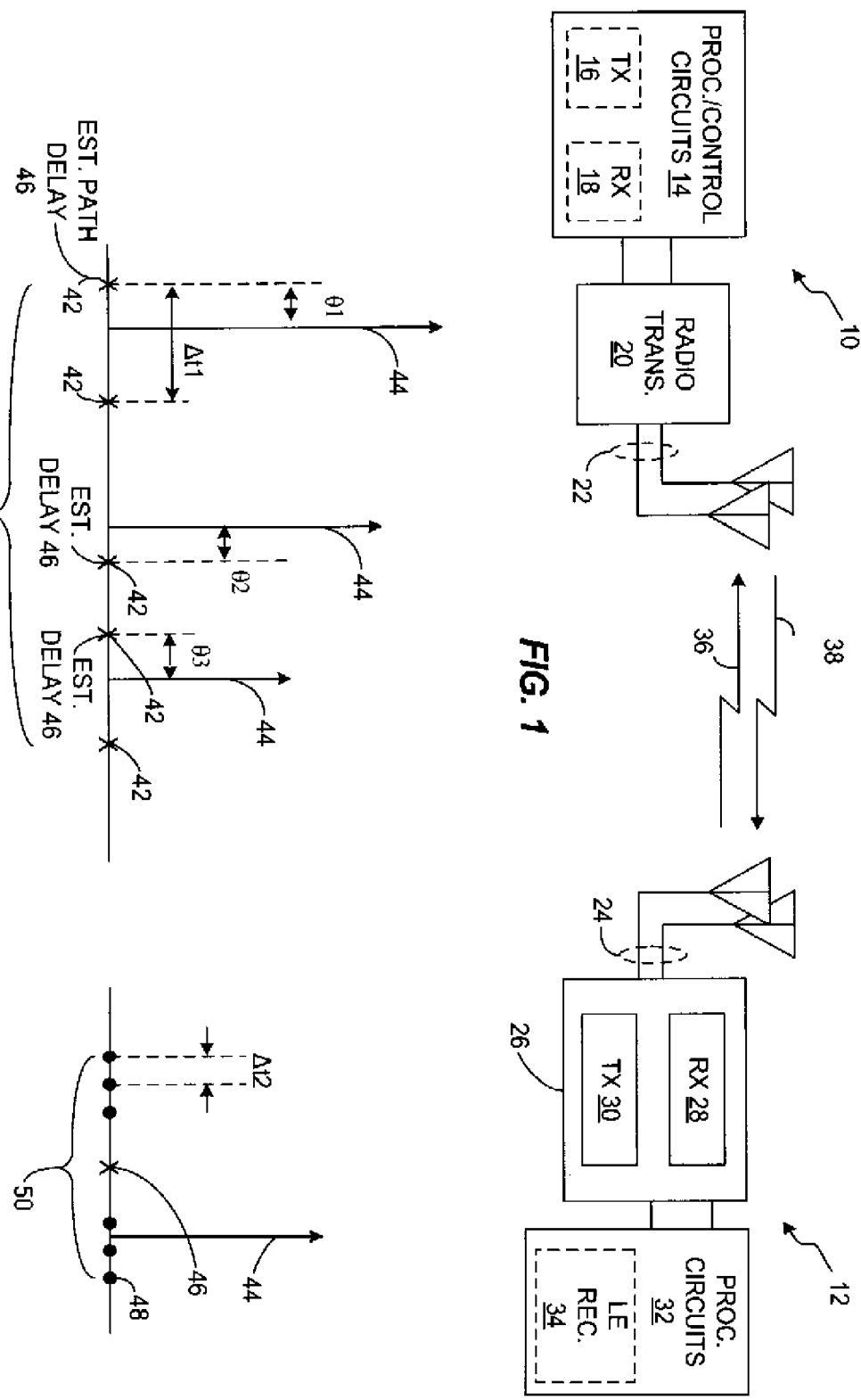

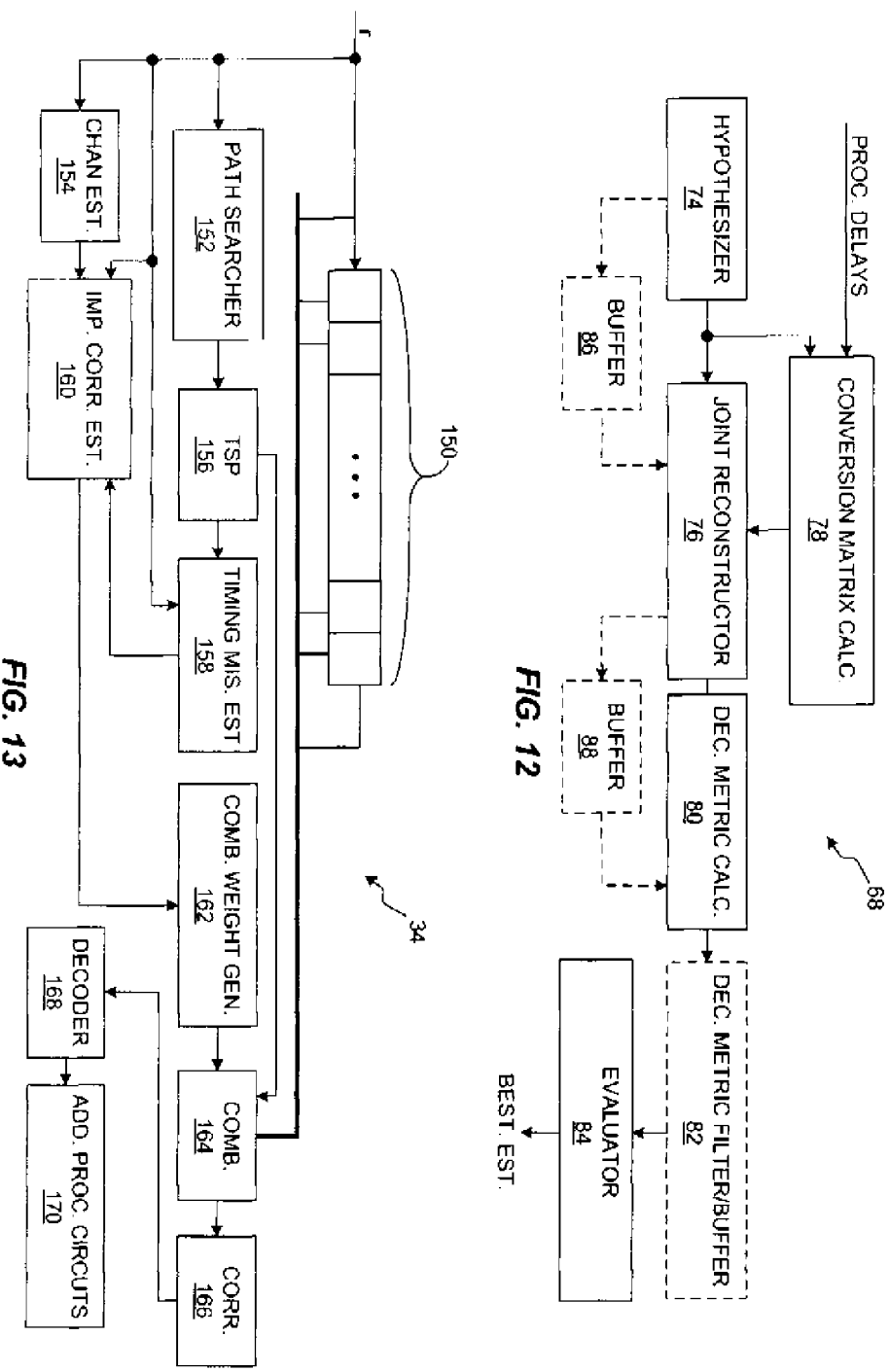

What is claimed is:

1. A method of compensating for processing timing misalignment in a communication receiver comprising:
    estimating a set of path delays for a received signal according to a first timing resolution, said set of estimated path delays corresponding to actual path delays of the received signal;
    setting a processing delay on each estimated path delay according to a second timing resolution, such that each processing delay is aligned with a respective one of the estimated path delays;
    estimating a timing misalignment between each one of two or more of the processing delays and the corresponding actual path delays by:
        forming a number of joint hypotheses, each joint hypothesis being a particular combination of one fractional timing offset value for each of the two or more processing delays, each such fractional timing offset value representing a hypothesized misalignment between the processing delay and the corresponding actual path delay;
        computing a decision metric for each joint hypothesis that indicates the accuracy of the joint hypothesis; and
        evaluating the decision metrics to identify a best estimate of timing misalignment for the two or more estimated path delays; and
    compensating coherent processing of the received signal according to the best estimate of timing misalignment.

2. The method of claim 1, further comprising estimating timing misalignment for each of two or more transmit/receive antenna pairings.

3. The method of claim 1, further comprising computing the decision metrics as smoothed decision metrics based on computing an instantaneous decision metric for each joint hypothesis in each of two or more time intervals, and maintaining a smoothed decision metric for each joint hypothesis by averaging corresponding ones of the instantaneous decision metrics over the two or more time intervals.

4. The method of claim 1, wherein computing a decision metric for each joint hypothesis that indicates the accuracy of the joint hypothesis comprises one of computing a signal quality metric as a function of the joint hypothesis, or computing a channel distance metric as a function of the joint hypothesis.

5. The method of claim 4, wherein computing a signal quality metric comprises estimating signal quality for the received signal assuming compensation of coherent signal processing according to the combination of fractional timing offsets included in the joint hypothesis.

6. The method of claim 4, wherein computing a channel distance metric as a function of the joint hypothesis comprises jointly reconstructing an effective net channel response over the set of path delays for the combination of fractional timing offsets in the joint hypothesis, and computing the channel distance metric as a function of the effective net channel response and a measured net channel response observed for the received signal.

7. The method of claim 1, wherein computing a decision metric for each joint hypothesis that indicates the accuracy of the joint hypothesis comprises jointly reconstructing an effective net channel response over the set of path delays for the joint hypothesis, and computing the decision metric as a distance metric determined as a function of a measured net channel response and the effective net channel response, wherein said effective net channel response is jointly reconstructed as a function of the measured net channel response and a conversion matrix that converts medium channel responses to net channel responses, wherein elements of the conversion matrix comprise the convolution of the transmit/receive pulse filters calculated for differences among the set of estimated path delays, as adjusted according to the combination of fractional timing offsets included in the joint hypothesis.

8. The method of claim 1, wherein estimating timing misalignment between two or more of the processing delays and actual path delays includes reducing estimation complexity by, for each one of the two or more processing delays, determining which one of two or more fractional timing offsets hypothesized for that processing delay is a best estimate of timing misalignment for that processing delay, as taken in combination with fixed fractional timing offsets for all remaining ones of the two or more processing delays.

9. The method of claim 1, wherein forming a number of joint hypotheses comprises defining a set of fractional timing offsets for each of the two or more processing delays, and forming each joint hypothesis as a different combination of fractional timing offsets taken across the sets of fractional timing offsets.

10. The method of claim 1, wherein compensating coherent processing of the received signal according to the best estimate of timing misalignment comprises calculating combining weights as a function of the combination of fractional timing offsets included in the best estimate of timing misalignment, said combining weights used for coherently combining signal values of the received signal obtained at the processing delays in a linear equalization process.

11. The method of claim 10, wherein calculating combining weights as a function of the combination of fractional timing offsets included in the best estimate of timing misalignment comprises incorporating the fractional timing offsets into a parametric model of impairment correlations, estimating impairment correlations for the received signal according to the parametric model, and calculating the combining weights as a function of the estimated impairment correlations.

12. The method of claim 1, wherein said setting a processing delay on each estimated path delay according to a second time resolution comprises placing a first Rake finger of a Generalized Rake receiver on each estimated path delay.

13. The method of claim 12, further comprising bracketing at least one of the first Rake fingers with second Rake fingers, by placing at least one second Rake finger at a defined placement offset on either side of each of the at least one first Rake fingers to be bracketed.

14. The method of claim 13, further comprising placing one or more third Rake fingers at defined placement offsets relative to one or more of the first Rake fingers.

15. The method of claim 1, wherein said setting a processing delay on each estimated path delay according to a second time resolution comprises selecting first chip equalization filter taps corresponding to the set of estimated path delays.

16. A wireless communication apparatus configured to compensate for received signal processing timing misalignment, the wireless communication apparatus comprising one or more processing circuits configured to:
  estimate a set of path delays for a received signal according to a first timing resolution, said set of estimated path delays corresponding to actual path delays of the received signal;
  set a processing delay on each estimated path delay according to a second timing resolution, such that each processing delay is aligned with a respective one of the estimated path delays;
  estimate a timing misalignment between each one of two or more of the processing delays and the corresponding actual path delays by:
    forming a number of joint hypotheses, each joint hypothesis being a particular combination of one fractional timing offset value for each of the two or more processing delays, each such fractional timing offset value representing a hypothesized misalignment between the processing delay and the corresponding actual path delay;
    computing a decision metric for each joint hypothesis that indicates the accuracy of the joint hypothesis; and
    evaluating the decision metrics to identify a best estimate of timing misalignment for the two or more estimated path delays; and
  compensate coherent processing of the received signal according to the best estimate of timing misalignment.

17. The wireless communication apparatus of claim 16, wherein the one or more processing circuits are configured to estimate timing misalignment for each of two or more transmit/receive antenna pairings.

18. The wireless communication apparatus of claim 16, wherein the one or more processing circuits are configured to compute the decision metrics as smoothed decision metrics based on computing an instantaneous decision metric for each joint hypothesis in each of two or more time intervals, and maintaining a smoothed decision metric for each joint hypothesis by averaging corresponding ones of the instantaneous decision metrics over the two or more time intervals.

19. The wireless communication apparatus of claim 16, wherein the one or more processing circuits are configured to compute a decision metric for each joint hypothesis that indicates the accuracy of the joint hypothesis by one of computing a signal quality metric as a function of the joint hypothesis, or computing a channel distance metric as a function of the joint hypothesis.

20. The wireless communication apparatus of claim 19, wherein the one or more processing circuits are configured to compute a signal quality metric as a function of the joint hypothesis by estimating signal quality for the received signal assuming compensation of coherent signal processing according to the combination of fractional timing offsets included in the joint hypothesis.

21. The wireless communication apparatus of claim 19, wherein the one or more processing circuits are configured to compute a channel distance metric as a function of the joint hypothesis by jointly reconstructing an effective net channel response over the set of path delays for the combination of fractional timing offsets in the joint hypothesis, and computing the channel distance metric as a function of the effective net channel response and a measured net channel response observed for the received signal.

22. The wireless communication apparatus of claim 16, wherein the one or more processing circuits are configured to compute a decision metric for each joint hypothesis that indicates the accuracy of the joint hypothesis by jointly reconstructing an effective net channel response over the set of path delays for the joint hypothesis, and computing the decision metric as a distance metric determined as a function of a measured net channel response and the effective net channel response, wherein said effective net channel response is jointly reconstructed as a function of the measured net channel response and a conversion matrix that converts medium channel responses to net channel responses, wherein elements of the conversion matrix comprise the convolution of the transmit/receive pulse filters calculated for differences among the set of estimated path delays, as adjusted according to the combination of fractional timing offsets included in the joint hypothesis.

23. The wireless communication apparatus of claim 16, wherein the one or more processing circuits are configured to estimate timing misalignment between two or more of the processing delays and actual path delays by, for each one of the two or more processing delays, determining which one of two or more fractional timing offsets hypothesized for that processing delay is a best estimate of timing misalignment for that processing delay, as taken in combination with fixed fractional timing offsets for all remaining ones of the two or more processing delays.

24. The wireless communication apparatus of claim 16, wherein the one or more processing circuits are configured to form a number of joint hypotheses by defining a set of fractional timing offsets for each of the two or more processing delays, and forming each joint hypothesis as a different combination of fractional timing offsets taken across the sets of fractional timing offsets.

25. The wireless communication apparatus of claim 16, wherein the one or more processing circuits are configured to compensate coherent processing of the received signal according to the best estimate of timing misalignment by calculating combining weights as a function of the combination of fractional timing offsets included in the best estimate of timing misalignment, said combining weights used for coherently combining signal values of the received signal obtained at the processing delays in a linear equalization process.

26. The wireless communication apparatus of claim 25, wherein the one or more processing circuits are configured to calculate combining weights as a function of the combination of fractional timing offsets included in the best estimate of timing misalignment by incorporating the fractional timing offsets into a parametric model of impairment correlations, estimating impairment correlations for the received signal according to the parametric model, and calculating the combining weights as a function of the estimated impairment correlations.

27. The wireless communication apparatus of claim 16, wherein the wireless communication apparatus includes a Generalized Rake receiver, and wherein the one or more processing circuits are configured to set a processing delay on each estimated path delay according to a second time resolution by placing a first Rake finger of the Generalized Rake receiver on each estimated path delay.

28. The wireless communication apparatus of claim 27, wherein the one or more processing circuits are configured to bracket at least one of the first Rake fingers with second Rake fingers of the Generalized Rake receiver, based on placing at least one second Rake finger at a defined placement offset on either side of each first Rake finger to be bracketed.

29. The wireless communication apparatus of claim 28, wherein the one or more processing circuits are configured to place one or more third Rake fingers of the Generalized Rake receiver at defined placement offsets relative to one or more of the first Rake fingers.

30. The wireless communication apparatus of claim 16, wherein wireless communication apparatus includes a chip equalization receiver, and wherein the one or more processing circuits are configured to set a processing delay on each estimated path delay according to a second time resolution by selecting first chip equalization filter taps of chip equalization receiver that correspond to the set of estimated path delays.

* * * * *

UNITED STATES PATENT AND TRADEMARK OFFICE
CERTIFICATE OF CORRECTION

PATENT NO. : 8,045,600 B2
APPLICATION NO. : 12/111526
DATED : October 25, 2011
INVENTOR(S) : Cairns et al.

It is certified that error appears in the above-identified patent and that said Letters Patent is hereby corrected as shown below:

On the Face Page, in the Figure, in Box "170", in Line 1, delete "PRDC." and insert -- PROC. --, therefor. See attached In Fig. 2, Sheet 1 of 8, delete "02" and insert -- θ2 --, therefor. See attached In Fig. 13, Sheet 8 of 8, in Box "170", in Line 1, delete "PRDC." and insert -- PROC. --, therefor. See attached In Column 24, Line 41, in Claim 24, delete "ioint" and insert -- joint --, therefor.

Signed and Sealed this
Tenth Day of April, 2012

David J. Kappos
*Director of the United States Patent and Trademark Office*

(12) United States Patent
Cairns et al.

(10) Patent No.: US 8,045,600 B2
(45) Date of Patent: Oct. 25, 2011

(54) METHOD AND APPARATUS FOR COMPENSATING FOR PROCESSING TIMING MISALIGNMENT IN A COMMUNICATION RECEIVER

(75) Inventors: Douglas A. Cairns, Durham, NC (US); Stephen J. Grant, Cary, NC (US); Andres Reial, Malmö (SE); Mathias Riback, Danderyd (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 848 days.

(21) Appl. No.: 12/111,526

(22) Filed: Apr. 29, 2008

(65) Prior Publication Data
US 2009/0268787 A1    Oct. 29, 2009

(51) Int. Cl.
*H04B 1/00* (2006.01)

(52) U.S. Cl. ........................ 375/148; 375/354; 375/316

(58) Field of Classification Search ............... 375/148, 375/354, 316
See application file for complete search history.

(56) References Cited

U.S. PATENT DOCUMENTS

| | | | |
|---|---|---|---|
| 6,674,815 B2* | 1/2004 | Zangi | 375/340 |
| 6,839,378 B1 | 1/2005 | Sourour et al. | |
| 6,922,434 B2 | 7/2005 | Wang et al. | |
| 7,751,511 B2* | 7/2010 | Reial et al. | 375/346 |
| 7,822,101 B2* | 10/2010 | Reial | 375/144 |
| 2004/0253934 A1* | 12/2004 | Ryu et al. | 455/101 |
| 2005/0047485 A1 | 3/2005 | Khayrallah et al. | |
| 2005/0195889 A1* | 9/2005 | Grant et al. | 375/148 |
| 2005/0201447 A1* | 9/2005 | Cairns et al. | 375/148 |
| 2006/0007990 A1* | 1/2006 | Cozzo et al. | 375/148 |
| 2006/0029124 A1* | 2/2006 | Grant et al. | 375/148 |
| 2006/0188007 A1* | 8/2006 | Daneshrad et al. | 375/148 |
| 2006/0268962 A1 | 11/2006 | Cairns et al. | |
| 2007/0047628 A1* | 3/2007 | Fulghum et al. | 375/148 |
| 2007/0098048 A1* | 5/2007 | Cairns et al. | 375/142 |
| 2007/0116100 A1* | 5/2007 | Lindoff et al. | 375/148 |
| 2007/0189364 A1* | 8/2007 | Wang et al. | 375/148 |
| 2008/0002759 A1* | 1/2008 | Cairns et al. | 375/148 |
| 2008/0267164 A1* | 10/2008 | D'Alessandro | 370/350 |
| 2009/0213944 A1* | 8/2009 | Grant | 375/260 |

FOREIGN PATENT DOCUMENTS

| | | |
|---|---|---|
| WO | 2006/070320 A1 | 7/2006 |
| WO | 2008/000367 A1 | 1/2008 |

OTHER PUBLICATIONS

Bottomley, "A generalized RAKE receiver for interference suppression," IEEE Journal on Selected Areas of Communication, vol. 18, pp. 1536-1545, Aug. 2000.*

(Continued)

*Primary Examiner* — Juan A Torres
(74) *Attorney, Agent, or Firm* — Coats & Bennett, P.L.L.C.

(57) ABSTRACT

According to the teachings presented herein, a wireless communication apparatus compensates for timing misalignment in its received signal processing. In at least one embodiment, the apparatus estimates a set of path delays for a received signal and sets processing delays on the estimated path delays. The apparatus jointly hypothesizes combinations of fractional timing offsets for two or more paths, and computes a decision metric for each joint hypothesis that indicates the accuracy of the joint hypothesis. As non-limiting examples, the decision metric may be a signal quality metric, or a distance metric (such as between a measured net channel response and an effective net channel response reconstructed as a function of the combination of fractional timing offsets included in the joint hypothesis). The apparatus evaluates the decision metrics to identify a best estimate of timing misalignment, and correspondingly compensates coherent processing of the received signal.

30 Claims, 8 Drawing Sheets